United States Patent
Yamamoto et al.

(10) Patent No.: US 11,620,834 B2
(45) Date of Patent: Apr. 4, 2023

(54) PERIPHERY MONITORING DEVICE

(71) Applicant: AISIN CORPORATION, Kariya (JP)

(72) Inventors: Kinji Yamamoto, Kariya (JP); Kazuya Watanabe, Kariya (JP); Makoto Hirata, Kariya (JP)

(73) Assignee: AISIN CORPORATION, Kariya (JP)

( * ) Notice: Subject to any disclaimer, the term of this patent is extended or adjusted under 35 U.S.C. 154(b) by 294 days.

(21) Appl. No.: 17/017,948

(22) Filed: Sep. 11, 2020

(65) Prior Publication Data
US 2021/0081684 A1 Mar. 18, 2021

(30) Foreign Application Priority Data

Sep. 12, 2019 (JP) .............................. JP2019-166660

(51) Int. Cl.
*G06K 9/00* (2022.01)
*G06V 20/58* (2022.01)
(Continued)

(52) U.S. Cl.
CPC ................ *G06V 20/58* (2022.01); *B60R 1/00* (2013.01); *B62D 15/021* (2013.01);
(Continued)

(58) Field of Classification Search
CPC ... B60R 1/00; B60R 2300/10; B60R 2300/20; B60R 2300/306; B60R 2300/607;
(Continued)

(56) References Cited

U.S. PATENT DOCUMENTS 9,308,863 B2 4/2016 Miyoshi et al.
2010/0289634 A1* 11/2010 Ikeda ..................... B60Q 9/005
340/441
(Continued)

FOREIGN PATENT DOCUMENTS

JP 3807330 B2 8/2006
JP 3894322 B2 3/2007
(Continued)

OTHER PUBLICATIONS

Extended Search Report dated Mar. 11, 2021 from the European Patent Office in Application No. 20195431.0.

*Primary Examiner* — Terrell M Robinson
(74) *Attorney, Agent, or Firm* — Sughrue Mion, PLLC

(57) ABSTRACT

A periphery monitoring device includes: an acquisition section acquiring a steering angle of a vehicle; an image acquisition section acquiring a captured image from an image capturing section that captures an image of a periphery of the vehicle; a detection section acquiring detection information of an object around the vehicle; and a control section causing a display section to display a synthesized image including a vehicle image showing the vehicle and a periphery image showing the periphery of the vehicle based on the captured image. When the object is detected on a course of the vehicle traveling at the steering angle by a predetermined distance, the control section causes a virtual vehicle image to be displayed in the synthesized image to be superimposed on a course to the object with a position of the vehicle as a reference.

18 Claims, 15 Drawing Sheets

(51) Int. Cl.
  *B60R 1/00* (2022.01)
  *B62D 15/02* (2006.01)
  *G06T 19/00* (2011.01)
  *G08G 1/16* (2006.01)

(52) U.S. Cl.
  CPC .......... *G06T 19/003* (2013.01); *G06T 19/006* (2013.01); *G08G 1/167* (2013.01); *B60R 2300/10* (2013.01); *B60R 2300/20* (2013.01); *B60R 2300/306* (2013.01); *B60R 2300/607* (2013.01); *B60R 2300/8093* (2013.01); *G06T 2210/21* (2013.01)

(58) Field of Classification Search
  CPC .......... B60R 2300/8093; B62D 15/021; G06T 19/003; G06T 19/006; G06T 2210/21; G08G 1/167
  See application file for complete search history.

(56) References Cited

U.S. PATENT DOCUMENTS

| | | | |
|---|---|---|---|
| 2013/0010117 A1* | 1/2013 | Miyoshi | G06F 3/0412 348/148 |
| 2014/0180567 A1* | 6/2014 | Fetsch | G08G 1/168 701/301 |
| 2016/0075377 A1* | 3/2016 | Tomozawa | B62D 15/028 701/41 |
| 2018/0225813 A1* | 8/2018 | Yokota | G06V 20/56 |
| 2018/0281681 A1 | 10/2018 | Sunohara et al. | |
| 2019/0009720 A1* | 1/2019 | Omiya | G08G 1/166 |
| 2020/0081607 A1 | 3/2020 | Yamamoto et al. | |
| 2020/0084395 A1 | 3/2020 | Watanabe et al. | |
| 2020/0086793 A1 | 3/2020 | Watanabe et al. | |
| 2020/0148222 A1 | 5/2020 | Yamamoto et al. | |
| 2020/0167996 A1 | 5/2020 | Watanabe et al. | |
| 2020/0238909 A1 | 7/2020 | Yamamoto et al. | |

FOREIGN PATENT DOCUMENTS

| | | |
|---|---|---|
| JP | 2008-090655 A | 4/2008 |
| JP | 5182137 B2 | 4/2013 |
| JP | 5605606 B2 | 10/2014 |
| JP | 5825323 B2 | 12/2015 |
| JP | 5855622 B2 | 2/2016 |
| JP | 2017-218008 A | 12/2017 |
| JP | 2019-060616 A | 4/2019 |
| JP | 2020-042355 A | 3/2020 |
| JP | 2020-042441 A | 3/2020 |
| JP | 2020-088697 A | 6/2020 |
| JP | 2020-120327 A | 8/2020 |
| WO | 2017/110144 A1 | 6/2017 |
| WO | 2018220912 A1 | 12/2018 |

\* cited by examiner

FIG.8
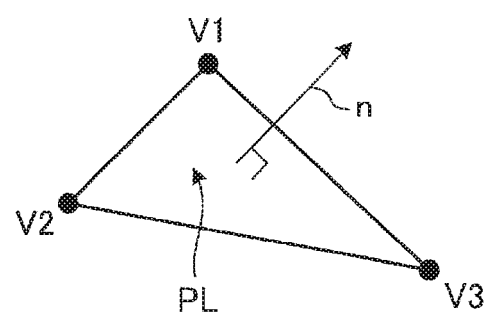
FIG.9
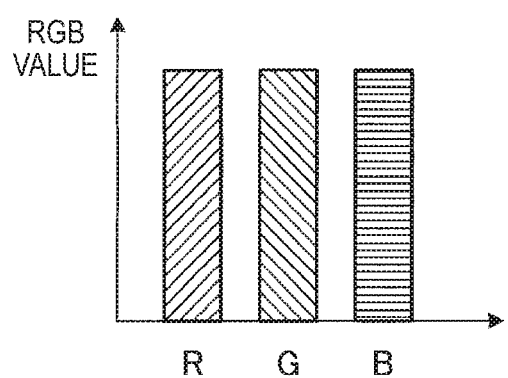
(WHEN OBJECT COMING INTO CONTACT WITH VEHICLE IS NOT DETECTED)
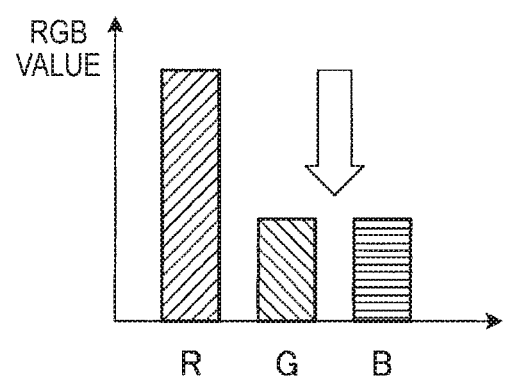
(WHEN OBJECT COMING INTO CONTACT WITH VEHICLE IS DETECTED)

PERIPHERY MONITORING DEVICE

CROSS REFERENCE TO RELATED APPLICATIONS

This application is based on and claims priority under 35 U.S.C. § 119 to Japanese Patent Application 2019-166660, filed on Sep. 12, 2019, the entire content of which is incorporated herein by reference.

TECHNICAL FIELD

Embodiments of this disclosure relate to a periphery monitoring device.

BACKGROUND DISCUSSION

A technology of detecting an object (obstacle or the like) around a vehicle based on a captured image obtained by an image capturing section capturing the periphery of the vehicle, calculating the expected course of wheels, and performing a report when the object is on the expected course has been proposed. An example of a known technology includes JP2008-90655A.

When an object having a possibility of coming into contact with the vehicle (an object requiring attention) is found, if not only reporting is performed, but also a positional relation between the object when the vehicle travels as it is and the vehicle can be provided in a state where a user (driver or the like) is allowed to recognize the positional relation more intuitively, it becomes easier and smoother to safely avoid the contact.

A need thus exists for a periphery monitoring device which is not susceptible to the drawback mentioned above.

SUMMARY

A periphery monitoring device according to an embodiment includes, for example, an acquisition section that acquires a current steering angle of a vehicle, an image acquisition section that acquires a captured image from an image capturing section that captures an image of a periphery of the vehicle, a detection section that acquires detection information of an object around the vehicle, and a control section that causes a display section to display a synthesized image including a vehicle image showing the vehicle and a periphery image showing the periphery of the vehicle based on the captured image. When the object is detected on a course when the vehicle travels at the current steering angle by a predetermined distance, the control section causes a virtual vehicle image virtually showing a shape of the vehicle to be displayed in the synthesized image so as to be superimposed on a course to the object with a position of the vehicle, which is shown by the vehicle image, as a reference. According to this configuration, for example, depending on whether or not the virtual vehicle image is displayed in the synthesized image, it is possible to perform a display that easily causes a user to intuitively recognize whether or not an object requiring attention is on a course, when the vehicle travels at the current steering angle.

BRIEF DESCRIPTION OF THE DRAWINGS

The foregoing and additional features and characteristics of this disclosure will become more apparent from the following detailed description considered with the reference to the accompanying drawings, wherein:

FIG. 1 is an exemplary and schematic perspective view illustrating a state in which a portion of a passenger compartment of a vehicle equipped with a periphery monitoring device according to an embodiment is seen through;

FIG. 8 is an exemplary and schematic diagram illustrating a display method when a vehicle image is displayed with polygons by the periphery monitoring device according to the first embodiment;

FIG. 9 is an exemplary and schematic diagram illustrating a method of determining a color of a polygon forming the virtual vehicle image by the periphery monitoring device according to the first embodiment;

DETAILED DESCRIPTION

Hereinafter, exemplary embodiments disclosed here will be disclosed. The configurations of the embodiments described below and the actions, the results, and the effects provided by the configurations are examples. The present disclosure may be realized by a configuration other than those disclosed in the following embodiments, and at least one of various effects based on the basic configuration and derivative effects may be obtained.

Description Of Entire System

Figure 1:
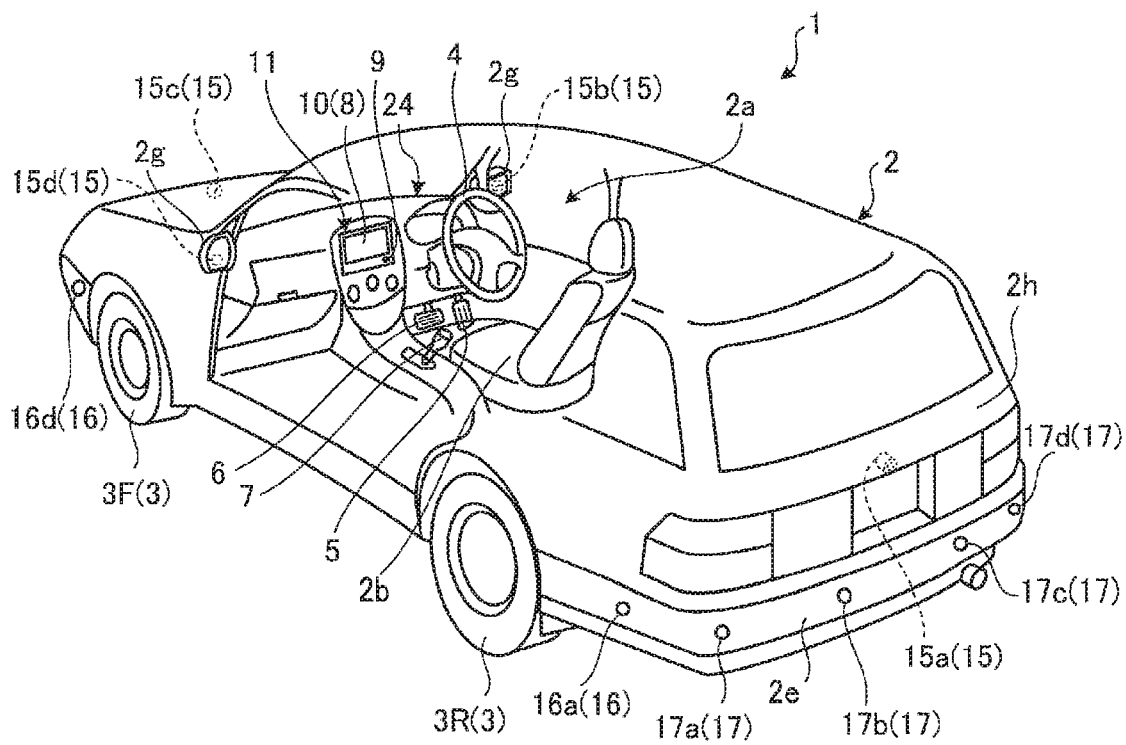

FIG. 1 is an exemplary and schematic perspective view illustrating a state in which a portion of a passenger compartment 2a of a vehicle 1 equipped with a periphery monitoring device according to an embodiment is seen through. The vehicle equipped with the periphery monitoring device according to the present embodiment may be an automobile (internal combustion engine automobile) that uses an internal combustion engine (engine) as a drive source, an automobile (electric automobile, fuel cell automobile, or the like) that uses an electric motor (motor) as the drive source, or an automobile (hybrid automobile) that uses both the internal combustion engine and the electric motor as the drive source. The vehicle may be equipped with various transmission devices and various devices (systems, components, and the like) necessary for driving the internal combustion engine and the electric motor. The method, the number, the layout, and the like of the device related to driving of the wheels in the vehicle may be set variously.

As illustrated in FIG. 1, a vehicle body 2 of the vehicle 1 forms the passenger compartment 2a in which an occupant (not illustrated) rides. A steering section 4, an acceleration operation section 5, a braking operation section 6, a gear shift operation section 7, and the like are provided in the passenger compartment 2a in a state of facing a seat 2b of a driver as an occupant. The steering section 4 is, for example, a steering wheel protruding from a dashboard 24. The acceleration operation section 5 is, for example, an accelerator pedal located under the foot of the driver. The braking operation section 6 is, for example, a brake pedal located under the foot of the driver. The gear shift operation section 7 is, for example, a shift lever protruding from the center console.

A display device (display section) 8 and a voice output device 9 as a voice output section are provided in the passenger compartment 2a. The display device 8 is, for example, a liquid crystal display (LCD) and an organic electroluminescent display (OELD). The voice output device 9 is, for example, a speaker. The display device 8 is covered with, for example, a transparent operation input section 10 such as a touch panel. The occupant (user) may visually recognize an image displayed on a display screen of the display device 8 through the operation input section 10. The occupant may operate the operation input section 10 with a finger or the like at a position corresponding to an image displayed on a display screen of the display device 8, by touching, pushing, or moving the operation input section 10, and thereby an operation input may be performed. The display device 8, the voice output device 9, the operation input section 10, and the like are provided on, for example, a monitor device 11 located at the center of the dashboard in a vehicle width direction, that is, in a left-right direction. The monitor device 11 may have an operation input section (not illustrated) such as a switch, a dial, a joystick, and a push button. A voice output device (not illustrated) may be provided at another position which is different from the position of the monitor device 11 in the passenger compartment 2a, and the voice may be output from the voice output device 9 in the monitor device 11 and another voice output device. The monitor device 11 may also be used as a navigation system or an audio system, for example.

Figure 2:
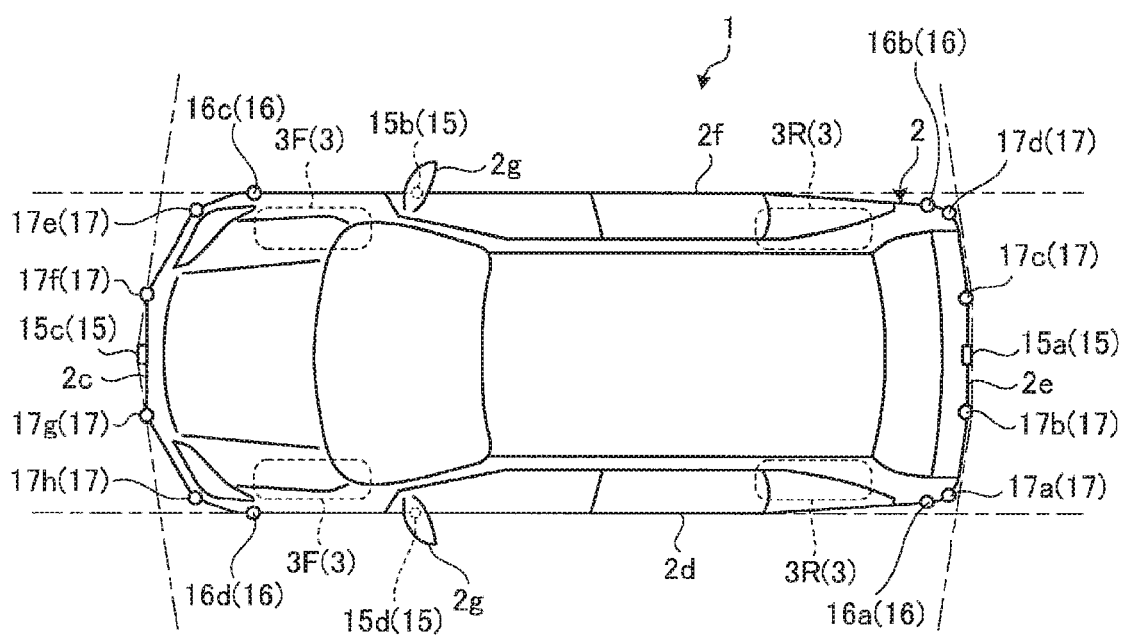
FIG. 2 is an exemplary and schematic plan view of the vehicle equipped with the periphery monitoring device according to the embodiment.

FIG. 2 is an exemplary and schematic plan view of the vehicle 1 equipped with the periphery monitoring device according to the present embodiment. As illustrated in FIGS. 1 and 2, the vehicle 1 is a four-wheeled automobile or the like, and has two left and right front vehicle wheels 3F and two left and right rear vehicle wheels 3R. All or some of the four wheels 3 may be steered.

For example, four image capturing sections 15a to 15d as a plurality of image capturing sections 15 are provided in the vehicle body 2. The image capturing section 15 is, for example, a digital camera including an image capturing element such as a charge coupled device (CCD) or a CMOS image sensor (CIS). The image capturing section 15 may output moving image data at a predetermined frame rate. Each of the image capturing sections 15 has a wide-angle lens or a fish-eye lens, and may capture an image in a range of 140° to 220° in the horizontal direction, for example. The optical axis of the image capturing section 15 is set obliquely downward. Thus, the image capturing section 15 sequentially captures an image of an external environment around the vehicle body 2, which includes a road surface on which the vehicle 1 may move and an area where the vehicle 1 may be parked, and outputs the captured image data.

The image capturing section 15a is located, for example, at the rear end portion 2e of the vehicle body 2 and is provided on the wall portion below the rear window of a door 2h of the rear hatch to capture an image of a situation in the rear area of the vehicle 1. The image capturing section 15b is located, for example, at the right end portion 2f of the vehicle body 2 and is provided on a right door mirror 2g to capture an image of a situation in an area including the right front side, the right side, and the right rear side of the vehicle 1. The image capturing section 15c is located, for example, on the front side of the vehicle body 2, that is, at the front end portion 2c in a vehicle front-rear direction, and is provided on a front bumper, and the like to capture an image of a situation in the front area of the vehicle 1. The image capturing section 15d is located, for example, on the left side of the vehicle body 2, that is, at the left end portion 2d in the vehicle width direction, and is provided on a door mirror 2g as a left-side projection portion, to capture images of situations in the left front side, the left side, and the left rear side of the vehicle 1. An ECU 14 (see FIG. 3) forming the periphery monitoring device may perform arithmetic processing or image processing based on the captured image data obtained by the plurality of image capturing sections 15, to generate an image having a wider viewing angle or to generate a virtual bird's-eye view image when the vehicle 1 is viewed from the above.

The vehicle 1 includes a plurality of radars 16 as a distance measuring section capable of measuring the distance to an object existing outside the vehicle 1. The radar 16 is, for example, a millimeter wave radar or the like, and may measure the distance to an object existing in a traveling direction of the vehicle 1. In the present embodiment, the vehicle 1 includes a plurality of radars 16a to 16d. The radar 16a is provided, for example, at the left end portion of the rear bumper of the vehicle 1 and is capable of measuring the distance to an object existing on the left rear side of the vehicle 1. The radar 16b is provided at the right end portion of the rear bumper of the vehicle 1 and is capable of measuring the distance to an object existing on the right rear side of the vehicle 1. The radar 16c is provided at the right end portion of the front bumper of the vehicle 1 and is capable of measuring the distance to an object existing in the right front side of the vehicle 1. The radar 16d is provided at the left end portion of the front bumper of the vehicle 1 and is capable of measuring the distance to an object existing in the left front side of the vehicle 1.

The vehicle 1 includes a sonar 17 capable of measuring the distance to an external object existing at a relatively short distance from the vehicle 1 using ultrasonic waves. In the present embodiment, the vehicle 1 includes a plurality of sonars 17a to 17h. The sonars 17a to 17d are provided on the rear bumper of the vehicle 1 and are capable of measuring the distance to an object existing behind the vehicle. The sonars 17e to 17h are provided on the front bumper of the vehicle 1 and are capable of measuring the distance to an object existing in front of the vehicle 1.

Figure 3:
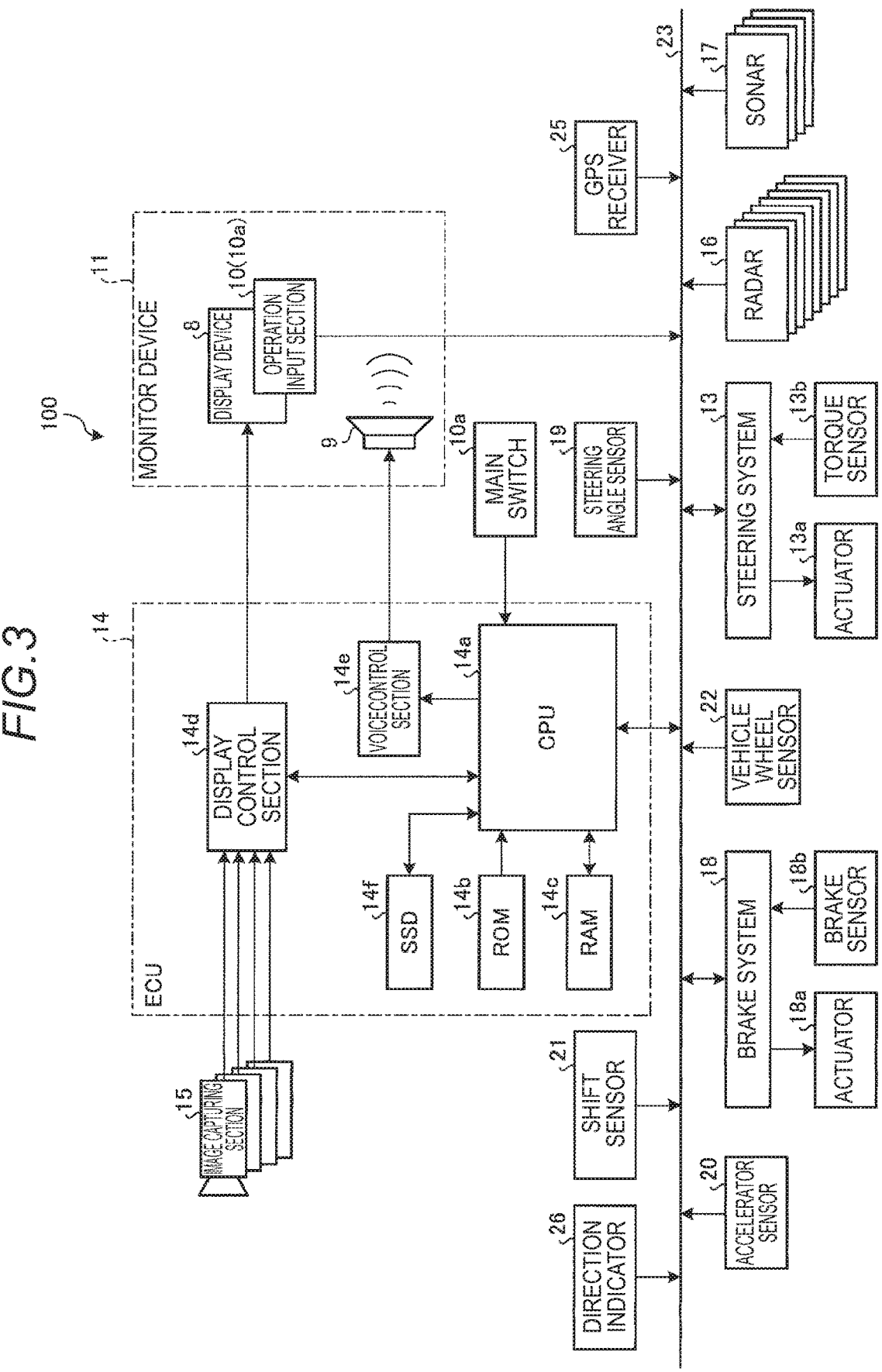
FIG. 3 is an exemplary and schematic block diagram illustrating a functional configuration of a control system of the vehicle including the periphery monitoring device according to the present embodiment.

FIG. 3 is an exemplary and schematic block diagram illustrating a functional configuration of a control system 100 of the vehicle 1 including the periphery monitoring device according to the present embodiment. As illustrated in FIG. 3, in the control system 100, a brake system 18, a steering angle sensor 19, an accelerator sensor 20, and a shift sensor 21, a vehicle wheel sensor 22, a global positioning system (GPS) receiver 25, a direction indicator 26, and the like in addition to the ECU 14, the monitor device 11, a steering system 13, the radars 16, the sonars 17, and the like are electrically connected to each other via an in-vehicle network 23 as an electric telecommunication line. The in-vehicle network 23 is configured as, for example, a controller area network (CAN). The ECU 14 may transmit a control signal via the in-vehicle network 23 to control the steering system 13, the brake system 18, and the like. For example, the ECU 14 may receive detection results of a torque sensor 13b, a brake sensor 18b, the steering angle sensor 19, the radar 16, the sonar 17, the accelerator sensor 20, the shift sensor 21, the vehicle wheel sensor 22, the GPS receiver 25, and the like, an operation signal of the operation input section 10, an operation signal of an operation lever of the direction indicator 26, and the like via the in-vehicle network 23.

The steering system 13 is an electric power steering system, a steer-by-wire (SBW) system, or the like. The steering system 13 includes an actuator 13a and the torque sensor 13b. The steering system 13 is electrically controlled by the ECU 14 or the like and steers the wheels 3 by operating the actuator 13a and applying a torque to the steering section 4 to supplement the steering force. The torque sensor 13b detects the torque applied to the steering section 4 by the driver and transmits the detection result to the ECU 14.

The brake system 18 includes an anti-lock brake system (ABS) that controls the lock of the brake of the vehicle 1, an electronic stability control (ESC) that suppresses the skid of the vehicle 1 during cornering, an electric brake system that augments the braking force to assist braking, and brake-by-wire (BBW). The brake system 18 includes an actuator 18a and the brake sensor 18b. The brake system 18 is electrically controlled by the ECU 14 and the like, and applies a braking force to the wheels 3 through the actuator 18a. The brake system 18 detects the lock of the brake, an idling of the wheel 3, a sign of skid, and the like from the rotational difference between the left and right wheels 3 and controls an occurrence of the lock of the brake, the idling of the wheel 3, and the skid to be suppressed. The brake sensor 18b is a displacement sensor that detects the position of the brake pedal that is a movable portion of the braking operation section 6, and transmits the detection result of the position of the brake pedal to the ECU 14.

The steering angle sensor 19 measures the steering amount of the steering section 4 such as a steering wheel. The steering angle sensor 19 is configured by a Hall element or the like, detects the rotation angle of the rotating portion of the steering section 4 as the steering amount, and transmits the detection result to the ECU 14. The accelerator sensor 20 is a displacement sensor that detects the position of the accelerator pedal that is a movable portion of the acceleration operation section 5, and transmits the detection result to the ECU 14.

The shift sensor 21 detects the position of the movable portion (bar, arm, button, and the like) of the gear shift operation section 7 and transmits the detection result to the ECU 14. The vehicle wheel sensor 22 includes a Hall element or the like, measures the rotation amount of the wheel 3 and the number of rotations of the wheel 3 per unit time, and transmits the detection result to the ECU 14. The GPS receiver 25 acquires the current position of the vehicle 1 based on the radio wave received from the artificial satellite. The direction indicators 26 are provided, for example, on the left and right door mirrors 2g. An operation signal of a movable portion (operation lever or the like) operated by the driver is transmitted to the ECU 14 and the direction indicator 26. The direction indicator 26 blinks or lights up, and thus the surroundings are notified of a direction in which the vehicle 1 is about to turn.

The configurations, arrangements, electrical connection forms, and the like of the various sensors and actuators described above are merely examples, and may be variously set (changed).

The ECU 14 is configured by a computer or the like, and controls the overall control of the vehicle 1 by cooperation of hardware and software. Specifically, the ECU 14 includes a central processing unit (CPU) 14a, a read only memory (ROM) 14b, a random access memory (RAM) 14c, a display control section 14d, a voice control section 14e, and a solid state drive (SSD) 14f. The CPU 14a, the ROM 14b, and the RAM 14c may be provided in the same circuit board.

The CPU 14a may read a program installed and stored in a non-volatile storage device such as the ROM 14b and perform arithmetic processing in accordance with the program. For example, the CPU 14a may perform calculation and control of image processing related to an image displayed on the display device 8. The CPU 14a may perform distortion correction processing of correcting distortion by performing arithmetic processing or image processing on the captured image data (bent image data) of a wide-angle image obtained by the image capturing section 15. Alternatively, the CPU 14a may generate a bird's-eye view image (periphery image) in which a vehicle image (own vehicle icon) showing the vehicle 1 is displayed, for example, at the center position, based on the captured image data obtained by image capturing of the image capturing section 15 and display the generated bird's-eye view image on the display device 8. When the CPU 14a generates a bird's-eye view image, the CPU 14a may change the position of a virtual viewpoint, and generate the bird's-eye view image that faces the vehicle image from the top or the bird's-eye view image that faces the vehicle image from an oblique direction.

When the CPU 14a detects an object on a course when the vehicle 1 travels by a predetermined distance at the current steering angle, by analyzing the captured image data, analyzing the distance measurement data by the radar 16 or the sonar 17, or the like, the CPU 14a may perform processing of displaying a virtual vehicle image showing the shape of the vehicle 1 in a superimposition manner. The virtual vehicle image is movable with the position of the vehicle 1 shown by the vehicle image in the bird's-eye view image, as a reference. In another embodiment, when the CPU 14a detects an object on the course when the vehicle 1 travels by a predetermined distance at the current steering angle, the CPU 14a may display the virtual vehicle image between the position of the object on the course and the position of the vehicle 1 shown by the vehicle image in the bird's-eye view image (in a synthesized image described later), in the superimposition manner. That is, when an object is detected, the CPU 14a may perform display such that the virtual vehicle image appears at a predetermined position on the course (for example, position corresponding to 2 m ahead of the vehicle 1). It is not necessary that the course when the vehicle 1 travels by a predetermined distance completely coincides with the actual movement trajectory of the vehicle 1. Such a course may have a predetermined amount of margin (error or margin), for example.

The ROM 14b stores various programs and parameters required for executing the programs. The RAM 14c temporarily stores various types of data used in the calculation by the CPU 14a. In the arithmetic processing in the ECU 14, the display control section 14d mainly performs image processing on image data which is acquired from the image capturing section 15 and output to the CPU 14a, conversion of the image data acquired from the CPU 14a into display image data to be displayed on the display device 8, and the like. In the arithmetic processing in the ECU 14, the voice control section 14e mainly performs processing of a voice which is acquired from the CPU 14a and is output to the voice output device 9. The SSD 14f is a rewritable non-volatile storage section, and continues to store the data acquired from the CPU 14a even when the power of the ECU 14 is turned off. The CPU 14a, the ROM 14b, the RAM 14c, and the like may be integrated in the same package. The ECU 14 may be configured to use another logic operation processor such as a digital signal processor (DSP), a logic circuit, or the like instead of the CPU 14a. A hard disk drive (HDD) may be provided instead of the SSD 14f, or the SSD 14f and the HDD may be provided separately from the ECU 14.

Figure 4:
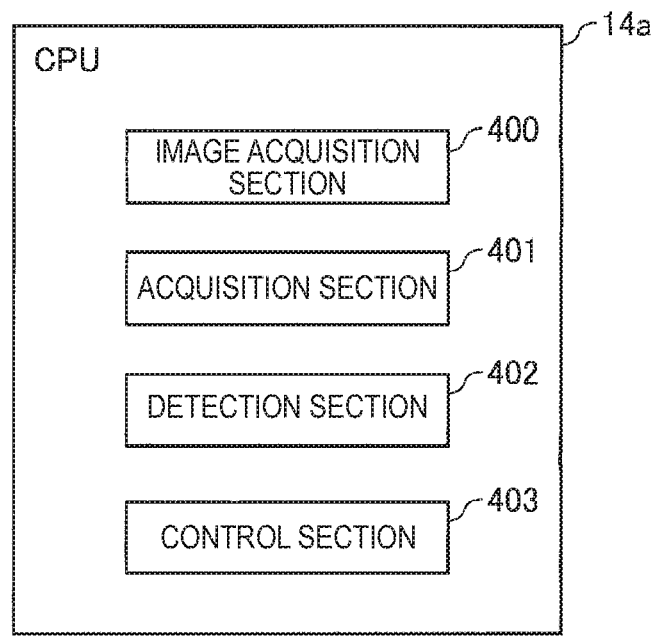
FIG. 4 is an exemplary and schematic block diagram illustrating a configuration of the periphery monitoring device according to the embodiment.

FIG. 4 is an exemplary and schematic block diagram illustrating a configuration when the periphery monitoring device according to the embodiment is realized by the CPU 14a. As illustrated in FIG. 4, the CPU 14a includes an image acquisition section 400, an acquisition section 401, a detection section 402, and a control section 403. The CPU 14a realizes the functions of the image acquisition section 400, the acquisition section 401, the detection section 402, and the control section 403 by executing a periphery monitoring program stored in the storage medium such as the ROM 14b or the SSD 14f. Some or all of the image acquisition section 400, the acquisition section 401, the detection section 402, and the control section 403 may be configured by hardware such as a circuit. Although not illustrated in FIG. 4, the CPU 14a may realize various modules required for traveling of the vehicle 1.

The image acquisition section 400 acquires a captured image obtained by the image capturing section 15 capturing an image of the periphery of the vehicle 1. The acquisition section 401 acquires the current steering angle of the vehicle 1. The acquisition section 401 acquires the steering amount measured by the steering angle sensor 19, as the current steering angle of the vehicle 1.

The detection section 402 may acquire detection information of an object having a possibility of coming into contact with the vehicle 1. Specifically, the detection section 402 detects an object which is on a course when the vehicle 1 travels at the current steering angle by a predetermined distance and has a possibility of coming into contact with the vehicle 1, based on the captured image obtained by the image capturing section 15 capturing an image of a traveling direction of the vehicle 1 and the distance measured by the radar 16 (distance between the vehicle 1 and the object existing in the traveling direction of the vehicle 1). The detection section 402 may acquire (detect) detection information of both a stationary object and a moving object having a possibility of approaching the vehicle 1 and then coming in contact with the vehicle 1, as an object having a possibility of coming into contact with the vehicle 1.

For example, the detection section 402 detects an object having a possibility of coming into contact with the vehicle 1, by performing image processing (for example, optical flow) on the captured image obtained by image capturing of the image capturing section 15. Alternatively, the detection section 402 detects an object having a possibility of coming into contact with the vehicle 1, based on the change in the distance measured by the radar 16.

The detection section 402 detects an object having a possibility of coming into contact with the vehicle 1, based on the captured image obtained by image capturing of the image capturing section 15 or the measurement result of the distance by the radar 16, and may detect an object existing at a relatively short distance from the vehicle 1. In this case, the detection section 402 may detect an object having a possibility of coming into contact with the vehicle 1, based on the measurement result of the distance by the sonar 17.

The detection section 402 transitions to an operation state (ON) or a non-operation state (OFF) in accordance with the operation of a detection start switch (not illustrated) of the vehicle 1. Here, the operation state is a state of detecting an object coming into contact with the vehicle 1. The non-operation state is a state of not detecting an object coming into contact with the vehicle 1.

Although the detection section 402 transitions to the operation state or the non-operation state in accordance with the operation of the detection start switch, the present disclosure is not limited to this. For example, when the speed of the vehicle 1 based on the detection result of the number of rotations of the wheels 3 by the vehicle wheel sensor 22 becomes equal to or slower than a preset speed (for example, 12 km/h), the detection section 402 may automatically (regardless of the operation of the detection start switch) transition to the operation state. When the speed of the vehicle 1 becomes faster than the preset speed, the detection section 402 may automatically (regardless of the operation of the detection start switch) transition to the non-operation state.

The control section 403 causes the display device 8 to display a display screen through the display control section 14d. The display screen includes a captured image obtained by the image capturing section 15 capturing an image of the traveling direction of the vehicle 1 and a synthesized image including a vehicle image and a periphery image. In the present embodiment, the control section 403 causes the display device 8 to display the display screen including the synthesized image and the captured image, but the control section 403 may cause the display device 8 to display the display screen including at least the synthesized image.

Here, the vehicle image is an image showing the vehicle 1. The vehicle image is a bird's-eye view image of the vehicle 1 viewed from above. Thus, it is possible to accurately grasp the positional relation between the vehicle 1 and an object around the vehicle 1. The vehicle image may be a bitmap image or an image showing the shape of the vehicle 1 configured by a plurality of polygons. Here, the vehicle image configured by the plurality of polygons is a three-dimensional shape of the vehicle 1, which is expressed by a plurality of polygons (for example, triangular polygons).

The periphery image is generated based on a captured image obtained by image capturing section 15 capturing an image of the periphery of the vehicle 1 and represents the periphery (surroundings) of the vehicle 1. The periphery image is a bird's-eye view image obtained when the periphery (surroundings) of the vehicle 1 is viewed downward from above. The periphery image is a bird's-eye view image of the periphery of the vehicle 1 around, for example, the center of the rear vehicle wheel axle of the vehicle image.

Further, when the detection section 402 detects an object on the course when the vehicle 1 has traveled by a predetermined distance at the current steering angle, the control section 403 may cause the virtual vehicle image which is movable with the position of the vehicle 1 shown by the vehicle image in the synthesized image, as a reference, and shows the shape of the vehicle 1 to be displayed to be superimposed. For example, the image acquisition section 400 may perform a display in which the virtual vehicle image is moved from the position of the vehicle image by a predetermined distance along the course based on the current steering angle. When the detection section 402 does not detect an object on the course when the vehicle 1 travels by the predetermined distance at the current steering angle, the control section 403 may cause the virtual vehicle image not to be displayed. Thus, the driver of the vehicle 1 can easily recognize whether or not an object having a possibility of coming into contact with the vehicle 1 is on the course when the vehicle 1 travels at the current steering angle, based on whether or not the display screen displayed on the display device 8 includes the virtual vehicle image. As described above, when the detection section 402 detects an object on the course when the vehicle 1 travels by a predetermined distance at the current steering angle, the control section 403 may cause the virtual vehicle image to appear at a predetermined position on the course.

Here, the predetermined distance is a preset distance, and may be set to, for example, 1.0 to 2.0 m, but the setting may be changed appropriately. The current steering angle is the steering angle at the current position of the vehicle 1. The control section 403 acquires the steering angle acquired by the acquisition section 401 as the steering angle at the current position of the vehicle 1.

The virtual vehicle image may be a virtual image showing the shape of the vehicle 1 configured by a plurality of polygons. The virtual vehicle image configured by a plurality of polygons is a three-dimensional shape of the vehicle 1 (three-dimensional shape of the vehicle 1), which is displayed by a plurality of polygons (for example, triangular polygons). As a result, it is possible to cause the display device 8 to display a more realistic virtual vehicle image.

The control section 403 causes the image showing the shape of the vehicle 1, which is configured by a plurality of polygons, to be included in a synthesized image as the virtual vehicle image. For example, the control section 403 may cause a bitmap image showing the shape of the vehicle 1 to be included in the synthesized image as the virtual vehicle image.

When the detection section 402 is in the operation state, the shift sensor 21 detects that the position of the gear shift operation section 7 is in the D range, and an object is detected on a course when the vehicle 1 moves forward by a predetermined distance at the current steering angle, the control section 403 causes the virtual vehicle image to be displayed in front of the vehicle 1. For example, the virtual vehicle image is moved away from the vehicle image along the course determined by the current steering angle. Thus, it is possible to realize a display that easily causes the driver to recognize an object on the course ahead of the vehicle 1.

Similarly, when the detection section 402 is in the operation state, the shift sensor 21 detects that the position of the gear shift operation section 7 is in the R range, and an object is detected on a course when the vehicle 1 travels backward by a predetermined distance at the current steering angle, the control section 403 causes the virtual vehicle image to be displayed behind the vehicle 1. Thus, it is possible to realize a display that easily causes the driver to recognize an object on the course behind the vehicle 1.

When the detection section 402 does not detect an object that comes into contact with the vehicle 1 on the course when the vehicle 1 travels by a predetermined distance, the control section 403 causes the virtual vehicle image in the synthesized image not to be displayed. That is, the control section 403 may realize a display that implies that there is no object having a possibility of coming into contact with the vehicle 1 on the course when the vehicle 1 travels by a predetermined distance at the current steering angle. Although will be described later, when an object does not exist on a course in a state where the virtual vehicle image is already displayed, for example, the steering angle may be changed or the object itself may move. In this case, the virtual vehicle image may be immediately caused not to be displayed, but may be caused not to be displayed after a predetermined period has elapsed. Since the virtual vehicle image is displayed for a predetermined period, it is possible to avoid the annoying display of repeatedly performing switching between the non-display and the display of the virtual vehicle image in a short time when an object exists around the course.

Further, when the detection section 402 detects an object being in contact with the vehicle 1, the control section 403 may cause a display form of an image of a portion (referred to as a partial image below) being in contact with the detected object in the virtual vehicle image to be changed. The control section 403 may change the display form of the partial image to a display form different from those of other portions of the virtual vehicle image, by blinking the partial image, changing the display color, or highlighted-displaying the contour of the partial image. Further, when the virtual vehicle image is configured by polygons, the control section 403 may specify, as the partial image, the polygon of the portion being in contact with the object among the polygons that form the virtual vehicle image. Then, the control section 403 may change the display form of the specified polygon.

Thus, it is possible to perform a display that easily causes the driver of the vehicle 1 to recognize a portion which is in contact with an object in the vehicle body of the vehicle 1 when the vehicle 1 travels at the current steering angle, from the displayed virtual vehicle image. As a result, it is possible to perform a display that facilitates a traveling operation that avoids contact between the detected object and the vehicle 1.

When an object being in contact with the vehicle 1 is detected, the control section 403 may move the virtual vehicle image to a contact position at which the vehicle 1 is in contact with the object in the synthesized image, and then cause the virtual vehicle image not to be moved from the contact position. That is, even when the virtual vehicle image is within a predetermined distance in which the virtual vehicle image is movable, the control section 403 stops the virtual vehicle image at the contact position with the object. When the object being in contact with the vehicle 1 is detected, the control section 403 fixes the virtual vehicle image without being moved from the contact position at which the vehicle 1 is in contact with the object in the synthesized image, but the present disclosure is not limited to this. For example, the control section 403 may stop moving of the virtual vehicle image at a position immediately before the contact position and fix the virtual vehicle image without being moved from the position. That is, the control section 403 superimposes and displays the virtual vehicle image at the contact position at which the vehicle 1 is in contact with the object or a position at which the vehicle 1 travels to a position before the contact, as the position when the vehicle 1 travels. Thus, the driver of the vehicle 1 can easily recognize a position on the course, at which the vehicle 1 comes into contact with the object, based on the current steering angle.

The followings are assumed. An object in contact with the vehicle 1 is detected, and the virtual vehicle image is fixed (stopped) at the contact position. Then, the current steering angle is changed, and the traveling direction of the vehicle 1 is changed. Thus, the detection section 402 does not detect an object coming into contact with the vehicle 1 on a new course (it is no longer in contact with the object). In this case, the control section 403 may cancel the fixation of the virtual vehicle image that has been fixed (stopped) at the contact position before changing the steering angle. The control section 403 may be able to restart the movement of the virtual vehicle image along the course in accordance with the changed steering angle. As a result, the control section 403 may move the position of the virtual vehicle image in the synthesized image by changing the steering angle of the vehicle 1. Thus, it is possible to perform a display that easily causes the driver to more clearly recognize that it is possible to eliminate the contact with an object and to eliminate a possibility of the contact by changing the steering angle. Regarding the further area, it is easy to continue traveling of the vehicle 1 while paying attention to a possibility of contact with another object. When it can be checked that the vehicle 1 and an object do not come into contact with each other by changing the steering angle or moving the object (moving object), the virtual vehicle image may be caused not to be displayed. In this case, for example, because it can be checked that the vehicle 1 and an object do not come into contact with each other, the virtual vehicle image may be caused not to be displayed after a lapse of a predetermined period, for example, after a lapse of a predetermined time or after the vehicle travels by a predetermined distance.

When the detection section 402 detects an object approaching a course when the vehicle 1 has traveled by a predetermined distance, the control section 403 may display an approaching object indicator (direction indicator) for the traveling direction of the vehicle 1 shown in the vehicle image in the synthesized image. Thus, the driver of the vehicle 1 can easily recognize the existing of an object approaching the vehicle 1 and an approaching direction thereof based on whether or not the display screen displayed on the display device 8 includes the approaching object indicator, with the display screen displayed on the display device 8.

Here, the approaching object indicator is an indicator that makes it possible to identify the direction in which an object approaches the vehicle 1 (referred to as the approaching direction below). The approaching object indicator is, for example, an arrow indicating the approaching direction. The approaching object indicator is an indicator that makes it possible to identify the approaching direction of a moving object among objects having a possibility of coming into contact with the vehicle 1.

When the detection section 402 detects an object approaching the vehicle 1, the control section 403 changes the display form of the approaching object indicator. Thus, the driver of the vehicle 1 can easily recognize from which direction an object having a possibility of coming into contact with the vehicle 1 is approaching, by visually recognizing the approaching object indicator having a changed display form. The control section 403 may cause the display form of the approaching object indicator to differ between a case where an object approaching the vehicle 1 is not detected and a case where such an object is detected, by changing the color of the approaching object indicator or blinking the approaching object indicator.

In the above-described example, when a stationary object is detected as an object having a possibility of coming into contact with the vehicle 1, the control section 403 changes the display form of the partial image in the virtual vehicle image. When a moving object is detected as an object having a possibility of coming into contact with the vehicle 1, the control section 403 changes the display form of the approaching object indicator. In another embodiment, when a moving object is detected as an object having a possibility of coming into contact with the vehicle 1, the control section 403 may change the display form of the partial image in the virtual vehicle image. In this case, the control section 403 may include the approaching object indicator in the synthesized image, or may not include the approaching object indicator in the synthesized image.

Next, a specific example of the display screen displayed on the display device 8 by the control section 403 will be described with reference to FIGS. 5 to 12.

First Embodiment

Figure 5:
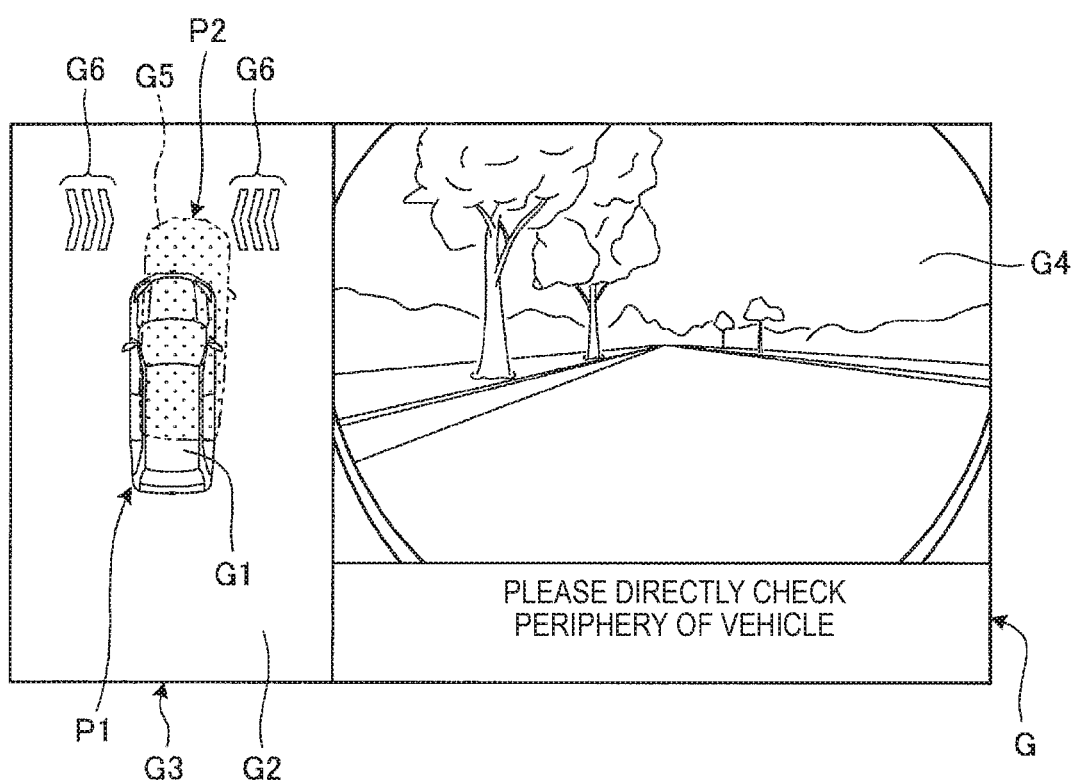
FIG. 5 is an exemplary and schematic diagram illustrating a display screen by the periphery monitoring device according to a first embodiment.

FIG. 5 is an exemplary and schematic diagram illustrating the display screen by the periphery monitoring device according to a first embodiment. In FIG. 5, display processing of the display screen when the shift sensor 21 detects that the position of the gear shift operation section 7 is in the D range will be described. In the first embodiment, the control section 403 causes the display device 8 to display a display screen G including a synthesized image G3 and a captured image G4 obtained by the image capturing section 15 capturing an image of the vehicle 1 in the traveling direction (for example, the front of the vehicle 1). The synthesized image G3 includes a vehicle image G1 and a periphery image G2.

When the detection section 402 is in the operation state, and an object is detected on the course when the vehicle 1 has traveled by a predetermined distance at the current steering angle acquired by the acquisition section 401, the control section 403 causes the virtual vehicle image G5 to be superimposed and displayed such that the virtual vehicle image G5 moves forward to a position P2 when the vehicle 1 has traveled by, for example, a predetermined distance at a steering angle at the current position P1 by using the position shown by the vehicle image G1 as a reference, in the periphery image G2. Here, the virtual vehicle image G5 is a semi-transmissive image showing the shape of the vehicle 1, as illustrated in FIG. 5. Thus, it is possible to easily distinguish the virtual vehicle image G5 and the vehicle image G1 from each other and to cause the driver of the vehicle 1 to intuitively recognize that the virtual vehicle image G5 is an image showing the future position P2 of the vehicle 1.

The control section 403 may display an image having transmittance which increases from the contour of the vehicle 1 toward the inside, as the virtual vehicle image G5. With this display, it is possible to more easily distinguish the virtual vehicle image G5 and the vehicle image G1 from each other, and to perform a display that causes the driver of the vehicle 1 to intuitively recognize that the virtual vehicle image G5 is an image showing the future position of the vehicle 1.

The control section 403 may cause the contour of the virtual vehicle image G5 to be displayed in a highlighted manner, by displaying the contour of the virtual vehicle image G5 in a display form (for example, different color, blinking, superimposition of a frame line) different from those of other portions of the virtual vehicle image G5. Thus, it is possible to improve visibility of the virtual vehicle image G5 and to perform a display that easily causes the driver to recognize the future position of the vehicle 1.

As described above, the virtual vehicle image G5 is displayed in a semi-transmissive manner or the contour of the virtual vehicle image is displayed in this manner, and thereby it is also possible to visually recognize the position of a portion (synthesized image G3) overlapping the virtual vehicle image G5, and it is easy to suppress deterioration of the visibility of the surrounding situation.

When the detection section 402 is in the operation state, as illustrated in FIG. 5, the control section 403 may cause an approaching object indicator G6 to be displayed in a traveling direction (for example, right and left positions corresponding to 1 m in front of the vehicle 1) of the vehicle image G1, in the periphery image G2. At this time, it is assumed that, when the detection section 402 does not detect an object, the control section 403 displays the approaching object indicator G6 in gray scale.

Figure 6:
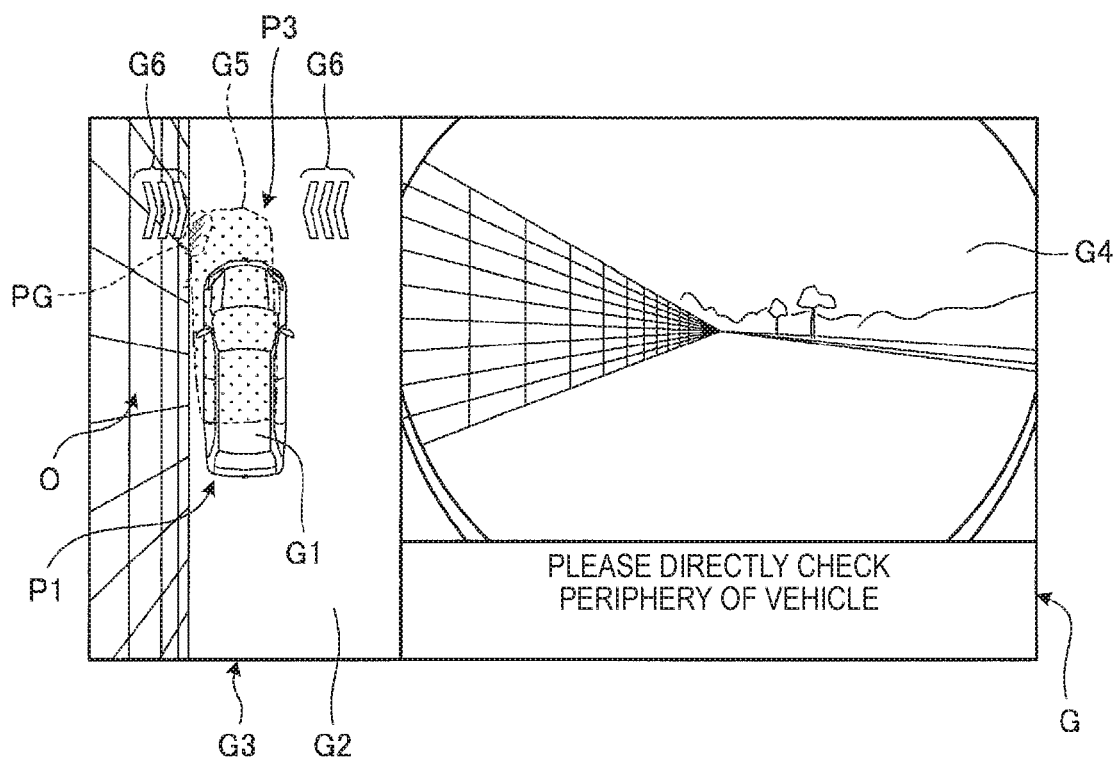
FIG. 6 is an exemplary and schematic diagram illustrating another display screen by the periphery monitoring device according to the first embodiment.

FIG. 6 is a diagram illustrating another display example of the display screen by the periphery monitoring device according to the first embodiment. When the detection section 402 does not detect an object on the course when the vehicle 1 has traveled by a predetermined distance at the current steering angle, the control section 403 causes the virtual vehicle image G5 not to be displayed in the periphery image G2. When the detection section 402 detects an object O (for example, a wall or a fence) that comes into contact with the vehicle 1 on the course when the vehicle 1 has traveled by a predetermined distance at the current steering angle, as illustrated in FIG. 6, the control section 403 moves the virtual vehicle image G5 from the vehicle image G1 to a contact position P3 to be in contact with the detected object O, in the periphery image G2. Then, even though the vehicle 1 moves at the current steering angle, the control section 403 fixes the virtual vehicle image G5 from the contact position P3 without moving the virtual vehicle image G5.

At this time, as illustrated in FIG. 6, the control section 403 causes the display form of a partial image PG to be in contact with the detected object O in the virtual vehicle image G5 to differ from display forms of other portions of the virtual vehicle image G5. For example, when the distance between the object O and the virtual vehicle image G5 becomes equal to or smaller than a predetermined value, the control section changes the display form of the partial image PG to a first display form that implies contact. For example, the control section 403 displays the partial image PG in red and displays the portions other than the partial image PG in the virtual vehicle image G5 in white. Thus, the driver of the vehicle 1 can grasp a portion of the vehicle body 2 of the vehicle 1, which is to be in contact with the detected object O when the vehicle 1 travels at the current steering angle. As a result, in order to prevent the vehicle 1 from coming into contact with the detected object O, it is possible to perform a display that easily causes the driver to determine what kind of driving operation is to be performed.

The control section 403 may change the display form of the partial image PG in accordance with the distance between the detected position of the object O and the position of the virtual vehicle image G5. Thus, it is possible to grasp the positional relation between the vehicle 1 and the object O in more detail by checking the change in the display form of the partial image PG. Specifically, for example, the control section 403 causes the partial image PG to be displayed in a highlighted manner, by increasing the redness of the partial image PG displayed in red or blinking the partial image PG as the distance between the detected position of the object O and the position shown by the virtual vehicle image G5 decreases. As a result, it is easy to cause the driver to pay stronger attention to the object with an image.

On the contrary, the control section 403 cancels the highlighted display of the partial image PG by reducing the redness of the partial image PG of the virtual vehicle image G5, changing the color to a color other than the red, for example, yellow, or increasing the blinking interval of the partial image PG as the distance between the detected position of the object O and the position shown by the virtual vehicle image G5 becomes longer. When the driver of the vehicle 1 steers the steering section 4 to change the traveling direction of the vehicle 1 and the detection section 402 no longer detects the object O coming into contact with the vehicle 1, the control section 403 brings the display form of the partial image PG back to the same display form as those of the other portions of the virtual vehicle image G5. The control section 403 cancels the fixation of the virtual vehicle image G5 at the contact position P3, and moves the position of the virtual vehicle image G5 in the synthesized image G3 again with the movement of the vehicle 1. As a result, it is possible to perform a display that easily causes the driver to more clearly recognize that the contact with the object O has been eliminated, and to continue driving while paying attention to the possibility of contact with another object in the further area. Even in FIG. 6, when it is checked that an object is not detected on the course when the vehicle 1 travels by a predetermined distance at the changed steering angle, after a predetermined period, for example, after a predetermined time has elapsed or the vehicle travels by a predetermined distance, the control section may cause the virtual vehicle image G5 not to be displayed.

Here, it is assumed that the object O detected by the detection section 402 is a stationary object such as a wall or a fence. Thus, the control section 403 changes the display form of the partial image PG in the virtual vehicle image G5, but does not change the display form of the approaching object indicator G6. That is, the driver of the vehicle 1 may check the display state of the approaching object indicator G6, and thereby identifying whether the object detected by the detection section 402 is a stationary object or a moving object approaching the vehicle 1.

In the case of FIG. 6, the control section 403 displays the display form of the approaching object indicator G6 in gray scale which is the display form of the approaching object indicator G6 when the detection section 402 does not detect a moving object having a possibility of coming into contact with the vehicle 1. However, when the object detected by the detection section 402 is a moving object such as another vehicle or a pedestrian, the control section 403 changes the display form of the approaching object indicator G6 in a direction in which the detected moving object exists among approaching object indices G6 in the periphery image G2. At that time, the control section 403 may change the display form of the approaching object indicator G6. In addition, when a moving object is on the course when the vehicle 1 travels by a predetermined distance at the current steering angle, the control section 403 may change the display form of the partial image PG being in contact with the detected moving object, in the virtual vehicle image G5.

When the object detected by the detection section 402 is a moving object approaching the vehicle 1, as described above, the control section 403 changes the display form of the approaching object indicator G6 existing in a direction in which the detected object approaches the vehicle 1, among the approaching object indices G6. For example, the control section 403 changes the color of the approaching object indicator G6 existing in the direction in which the detected object approaches the vehicle, to yellow or the like, or causes the approaching object indicator G6 to blink. Alternatively, when each approaching object indicator G6 includes a plurality of arrows, the control section 403 may display a plurality of arrows of the approaching object indicator G6 displayed in the direction in which the detected moving object exists, in an animation that changes the display form in order from the arrow farther from the virtual vehicle image G5, and may display the arrows to perform scrolling.

Figure 7:
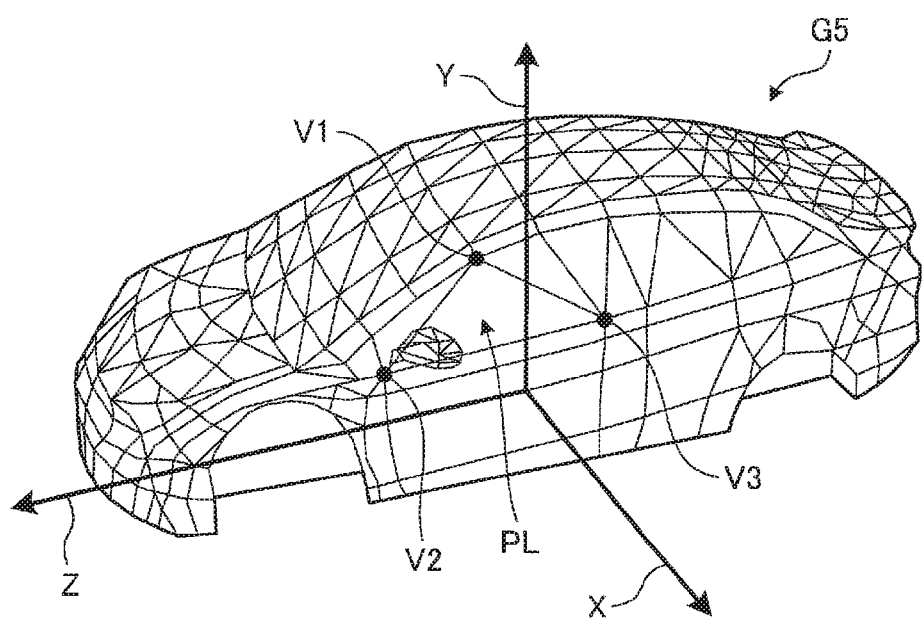
FIG. 7 is an exemplary and schematic diagram illustrating an example of a method of displaying a virtual vehicle image by the periphery monitoring device according to the first embodiment.

FIGS. 7 and 8 are diagrams illustrating an example of a method of displaying the virtual vehicle image by the periphery monitoring device according to the first embodiment. In FIG. 7, an X-axis corresponds to the vehicle width direction of the vehicle 1. A Z-axis corresponds to the traveling direction of the vehicle 1, and a Y-axis corresponds to a height direction of the vehicle 1. When the virtual vehicle image G5 is configured by a plurality of polygons PL, as illustrated in FIGS. 7 and 8, the control section 403 obtains a value (referred to as a Y component) of a normal vector n of vertices V1, V2, and V3 of each polygon PL in a Y-axis direction (direction vertical to the road surface). The control section 403 determines the transmittance of the polygon PL based on the Y component of the normal vector n.

Specifically, the control section 403 obtains the Y component of the normal vector n of the vertices V1, V2 and V3 of the polygon PL. Then, the control section 403 determines pixels in the polygon PL based on the Y component of the normal vector n of the vertices V1, V2 and V3. At this time, the control section 403 sets the transmittance to increase as the Y component of the normal vector n increases. That is, the control section 403 may increase the transmittance of a portion (roof portion, hood portion, and the like) parallel to the ground. As a result, it is possible to display, as the virtual vehicle image G5, an image that becomes transparent more from the contour of the vehicle 1 toward the inside. In the present embodiment, the color of the pixels forming the polygon PL is white, but the color is not limited to this, and the color may be set to any color such as the color of the body of the vehicle 1, for example.

FIG. 9 is a diagram illustrating an example of a method of determining the color of the polygon forming the virtual vehicle image by the periphery monitoring device according to the first embodiment. In FIG. 9, a horizontal axis indicates the types of colors (for example, RGB) that form the vertex of the polygon that forms the virtual vehicle image G5. A vertical axis indicates the values of the colors (for example, RGB values) forming the vertex of the polygon forming the virtual vehicle image G5. In the present embodiment, when an object is detected on the course when the vehicle 1 travels by a predetermined distance at the current steering angle and the virtual vehicle image G5 is displayed, and further when the distance between the object and the virtual vehicle image G5 is equal to or smaller than a predetermined value, the control section 403 causes the display form of the partial image PG being in contact with the object in the virtual vehicle image G5 to differ from the display forms of other portions of the virtual vehicle image G5.

Specifically, when the object is detected on the course when the vehicle 1 travels by a predetermined distance at the current steering angle, but the distance between the object and the virtual vehicle image G5 is greater than the predetermined value, as illustrated in FIG. 9, the control section 403 causes the RGB color values of the vertices of the polygon forming the virtual vehicle image G5 to be equal to each other. Then, the control section 403 determines the color of the entirety of the polygon by interpolating the color of an area in the polygon surrounded by the vertices by linear interpolation or the like, based on the RGB color values of the vertices of the polygon. Accordingly, the control section 403 can display the virtual vehicle image G5 in white.

When the distance between the object detected on the course and the virtual vehicle image G5 is equal to or smaller than the predetermined value, as illustrated in FIG. 9, the control section 403 sets, for example, GB values of each vertex of the polygon forming the partial image among the polygons forming the virtual vehicle image G5 to be smaller than the R value of the vertex. In this case, the control section 403 also determines the color of the entirety of the polygon by interpolating the color of an area in the polygon surrounded by the vertices by linear interpolation or the like, based on the RGB color values of the vertices of the polygon. Accordingly, the control section 403 can display the partial image PG in red.

In the present embodiment, the control section 403 causes the partial image PG to be displayed in a highlighted manner by setting the GB values of each vertex of the polygon forming the partial image to be smaller than the R value of the vertex and displaying the partial image in red, but the present disclosure is not limited to this. For example, the control section 403 may cause the partial image PG to be displayed in a highlighted manner by setting the RB values of each vertex of the polygon forming the partial image PG to be smaller than the G value of the vertex and displaying the partial image PG in green.

At this time, the control section 403 may reduce the GB values of each vertex of the polygon forming the partial image PG of the virtual vehicle image G5, as the distance between the position of the detected object and the position of the virtual vehicle image G5 is reduced. Thus, the control section 403 causes the partial image PG to be displayed in a highlighted manner by increasing the redness of the partial image PG. Accordingly, it is possible to more easily recognize which position of the vehicle body of the vehicle 1 comes into contact with the object and to easily cause the driver to recognize the degree of attention when the vehicle 1 is moved. The control section 403 causes the RGB color values of each vertex of a polygon other than the polygons of the partial image PG among the polygons forming the virtual vehicle image G5 to be equal to each other. Thus, the control section 403 can display the polygons other than the polygons of the partial image PG, in white.

Figure 10:
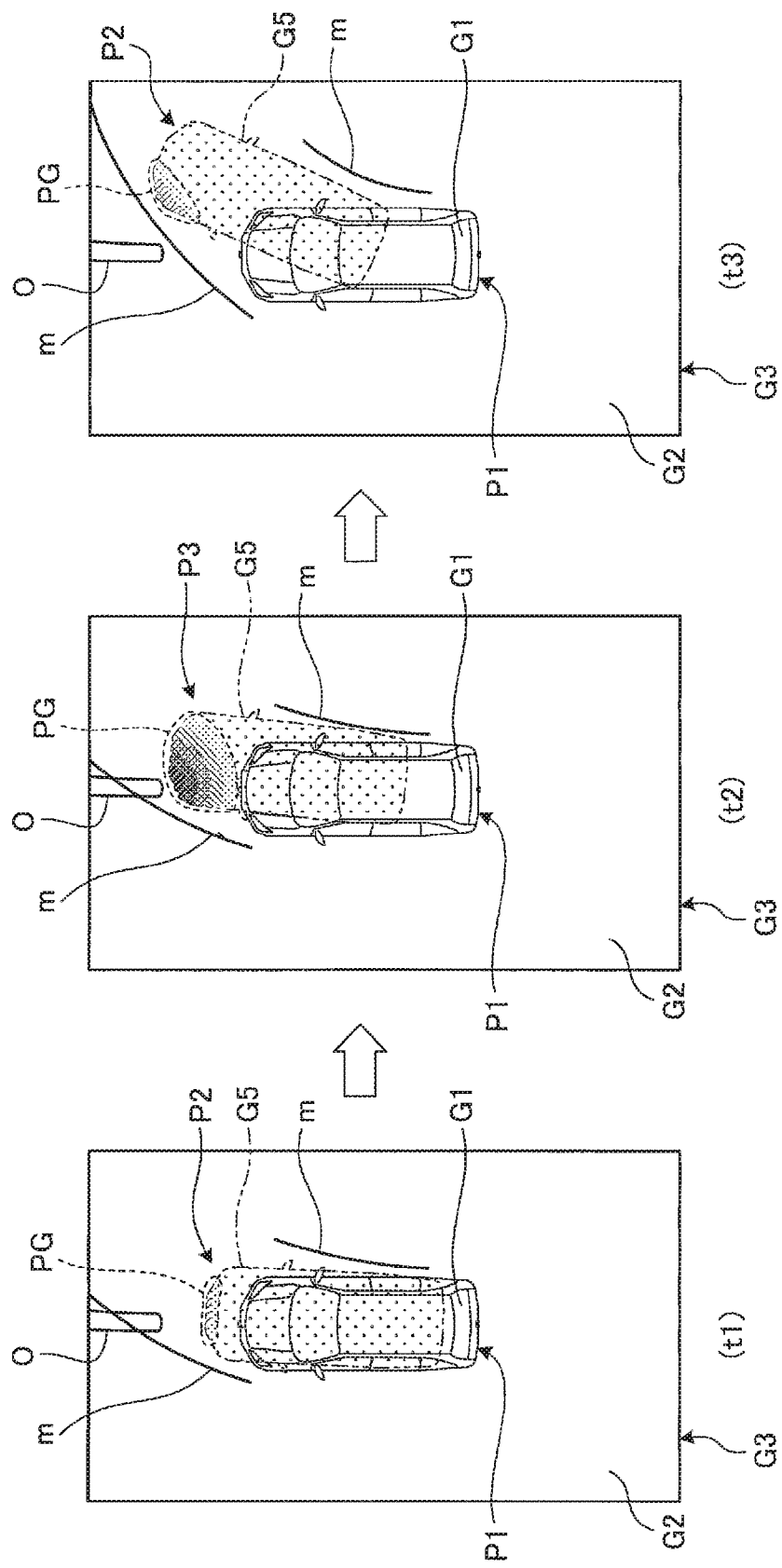
FIG. 10 is an exemplary and schematic diagram illustrating display of the virtual vehicle image by the periphery monitoring device according to the first embodiment.

FIG. 10 is a diagram illustrating an example of the display screen by the periphery monitoring device according to the first embodiment. For example, as illustrated in FIG. 10, at a time point t1, when the detection section 402 detects an object O (stationary object) on the course when the vehicle 1 travels by a predetermined distance at the current steering angle, the control section 403 displays the virtual vehicle image G5 to be superimposed on the periphery image G2 such that the virtual vehicle image G5 moves forward by a predetermined distance with the position of the vehicle image G1 as a reference. The distance from the detected object O is reduced by the forward movement of the virtual vehicle image G5. When the distance is equal to or smaller than a predetermined value, the control section changes the partial image PG of the virtual vehicle image G5, which is to be in contact with the object O, to the first display form (for example, red highlighted display) that implies the contact with the object O. In FIG. 10, a guide line m is an expected movement trajectory of the vehicle image G1 predicted when the vehicle 1 moves at the current steering angle. For example, the guide line is displayed at a position obtained by adding a predetermined margin to the vehicle width of the vehicle image G1. The guide line m may be caused not to be displayed.

Specifically, the control section 403 obtains the Euclidean distance to the object O from each vertex of the polygon forming the partial image PG on an XZ plane (see FIG. 7) parallel to the road surface. Then, the control section 403 causes the GB values of each vertex to be smaller than the R value of the vertex in accordance with the Euclidean distance between each vertex of the polygon forming the partial image PG and the object O. The control section 403 determines the color of a pixel in the polygon forming the partial image PG by the fragment shader based on the RGB values of each vertex of the polygon forming the partial image PG. The control section 403 determines the color of the entirety of the polygon by interpolating the color of an area in the polygon surrounded by the vertices by linear interpolation or the like, based on the RGB color values of the vertices of the polygon. Accordingly, the control section 403 displays the partial image PG in red. When the RGB values of the polygon forming the virtual vehicle image are calculated, the RGB values of the polygon forming the partial image may be simultaneously calculated in accordance with the distance between each vertex of the polygon and the object. Thus, it is possible to generate the virtual vehicle image G5 and the partial image PG without being separate from each other.

Then, the vehicle 1 continues to move. At a time point t2 after the time point t1, when the vehicle 1 reaches the contact position P3 at which the virtual vehicle image G5 is in contact with the object O or a position immediately before the contact position P3, the control section 403 temporarily stops the virtual vehicle image G5 at the contact position P3 and continues the display at this position. In this case, as shown at the time point t2, the control section may change the display color of the partial image PG in accordance with the distance from the object O. For example, the control section may set the tint of the partial image PG to be increased (the redness may be increased) so as to imply that the vehicle is closer to the object. Alternatively, the control section may set the red tint to be increased at a portion in which a distance from the object O is equal to or smaller than the predetermined value, and set the yellow tint to be increased at a portion in which the distance is greater than the predetermined value.

At a time point t3 after the time point t2, a case where the steering angle of the vehicle 1 is changed and there is no possibility that the vehicle 1 is to be in contact with the object O, that is, a case where the detection section 402 does not detect the object O on a course by the changed steering angle is shown. At the time point t3, the contact between the object O and the virtual vehicle image G5 can be avoided. As illustrated in FIG. 10, the control section 403 cancels the fixation of the virtual vehicle image G5 at the contact position P3, and displays the virtual vehicle image G5 at the position P2 when the vehicle 1 travels by the predetermined distance with the position of the vehicle 1 shown by the vehicle image G1 at the time point t3, as a reference. That is, the restart of moving the virtual vehicle image G5 is permitted. As a result, regarding the further area, a display that easily causes traveling to continue while the driver pays attention to a possibility of contact with another object is performed.

At this time, the control section 403 may change the partial image PG in the virtual vehicle image G5 from, for example, the red color being the first display form that implies the contact between the object O and the virtual vehicle image G5 to the yellow color being a second display form that implies the contact avoidance. In another embodiment, the control section may cancel the highlighted display which is displayed in red. That is, the control section 403 brings the display form of the partial image PG in the virtual vehicle image G5 back to the same display form (for example, white) as the other portions of the virtual vehicle image G5, at the time point t3. Thus, it is possible to provide the driver of the vehicle 1 with a display showing that the contact with the object O can be avoided at the current steering angle (changed steering angle) of the vehicle 1.

Figure 11:
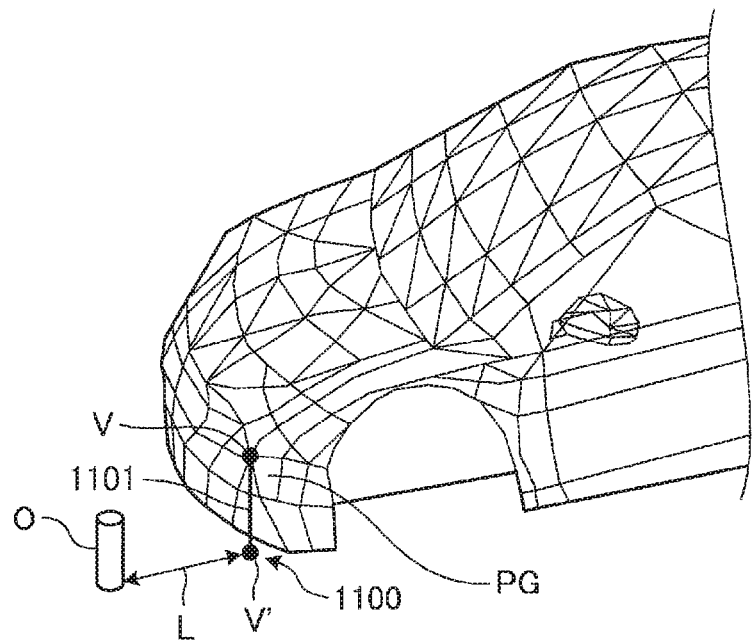
FIG. 11 is an exemplary and schematic diagram illustrating a process of highlighted-displaying a partial image by the periphery monitoring device according to the first embodiment.
Figure 12:
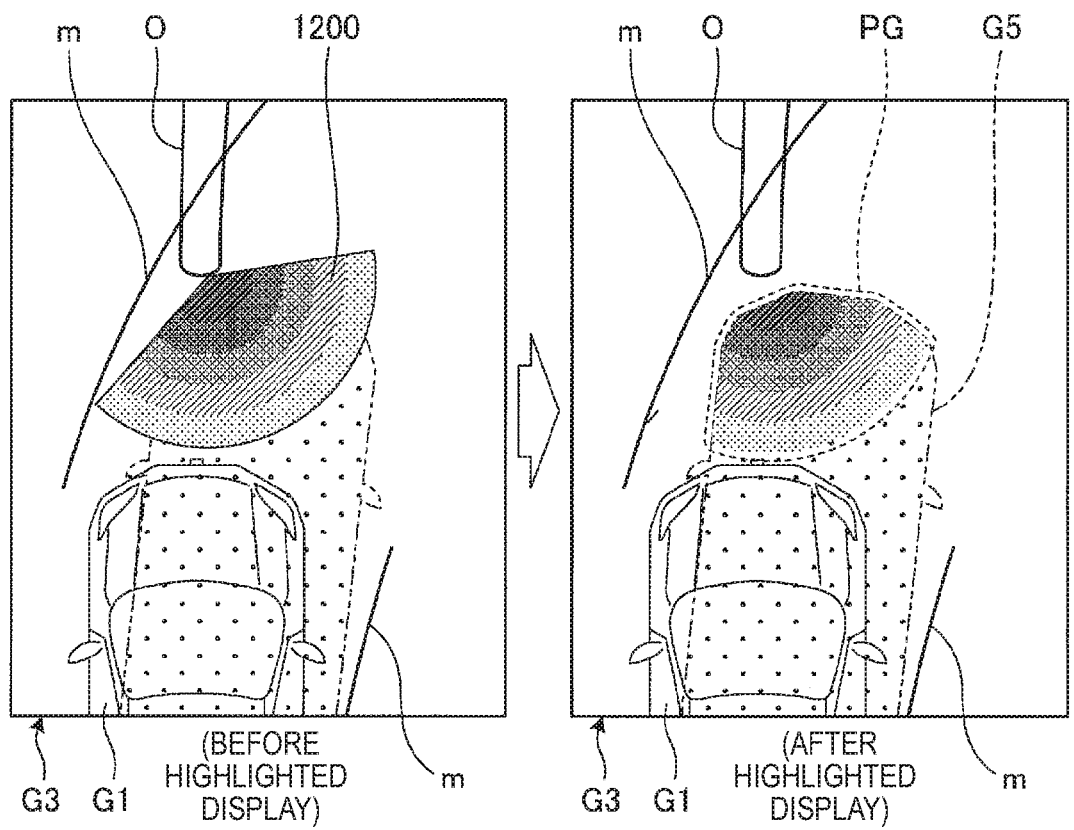
FIG. 12 is an exemplary and schematic diagram illustrating the process of highlighted-displaying the partial image by the periphery monitoring device according to the first embodiment.

FIGS. 11 and 12 are diagrams illustrating an example of processing of highlighted-displaying the partial image PG by the periphery monitoring device according to the first embodiment. When the detection section 402 detects the object O, as illustrated in FIG. 11, the control section 403 firstly obtains a point V' at which a perpendicular line 1101 to the XZ plane 1100 (plane defined by the X-axis and the Z-axis illustrated in FIG. 7) from each vertex V of the polygon forming the partial image PG in the virtual vehicle image G5 intersects the XZ plane 1100. Then, the control section 403 obtains the Euclidean distance L between the point V' and the position of the object O in the XZ plane 1100.

The control section 403 specifies the degree of a highlighted display corresponding to the obtained Euclidean distance L, in accordance with intensity distribution 1200 illustrated in FIG. 12. Here, the intensity distribution 1200 is distribution of the degree of the highlighted display when the partial image is displayed in a highlighted manner. The degree of the highlighted display increases as the Euclidean distance L is reduced.

In the present embodiment, the intensity distribution 1200 is concentric intensity distribution in which the position of the object O is set as the center, and the degree of the highlighted display is reduced with the Euclidean distance L increasing. For example, the intensity distribution 1200 is represented by a high-order curve in which the degree of the highlighted display sharply increases when the Euclidean distance L is equal to or smaller than a preset distance (for example, 1.7 to 3.0 m). For example, the intensity distribution 1200 is intensity distribution in which the GB values sharply decrease and R is emphasized when the Euclidean distance L is equal to or smaller than a preset distance.

Thus, as illustrated in FIG. 12, the control section 403 performs the highlighted display of the polygon in which the Euclidean distance L to the object O becomes closer among the polygons forming the virtual vehicle image G5, in red. As a result, as illustrated in FIG. 12, the control section 403 can perform the highlighted display of the polygon forming the partial image PG among the polygons forming the virtual vehicle image G5, with the red color.

As described above, according to the vehicle 1 in the first embodiment, it is possible to perform a display that easily causes the driver to recognize whether or not an object O is on a course when the vehicle 1 travels by a predetermined distance at the current steering angle, based on whether or not the display screen displayed on the display device 8 includes the virtual vehicle image G5.

Second Embodiment

A second embodiment is an example in which a display screen including a three-dimensional image of the periphery of the vehicle instead of the captured image obtained by the image capturing section capturing the image of the traveling direction of the vehicle is displayed on the display device. In the following description, the description of components similar to those in the first embodiment will not be repeated.

Figure 13:
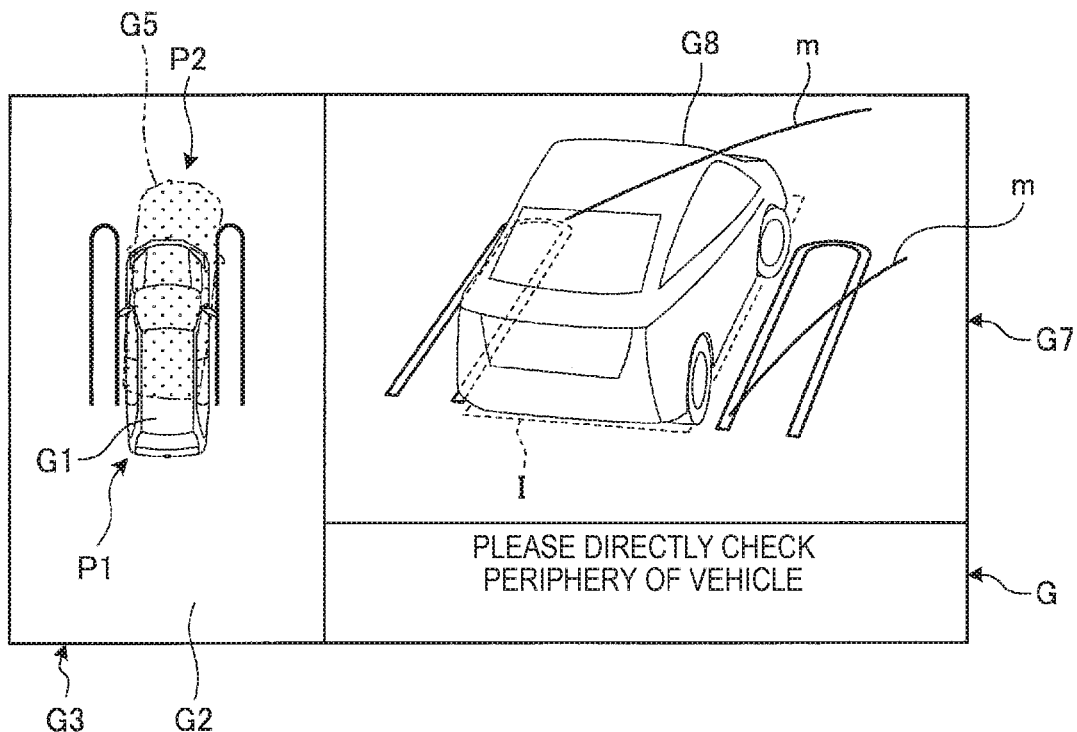
FIG. 13 is an exemplary and schematic diagram illustrating a display screen by a periphery monitoring device according to a second embodiment.
Figure 14:
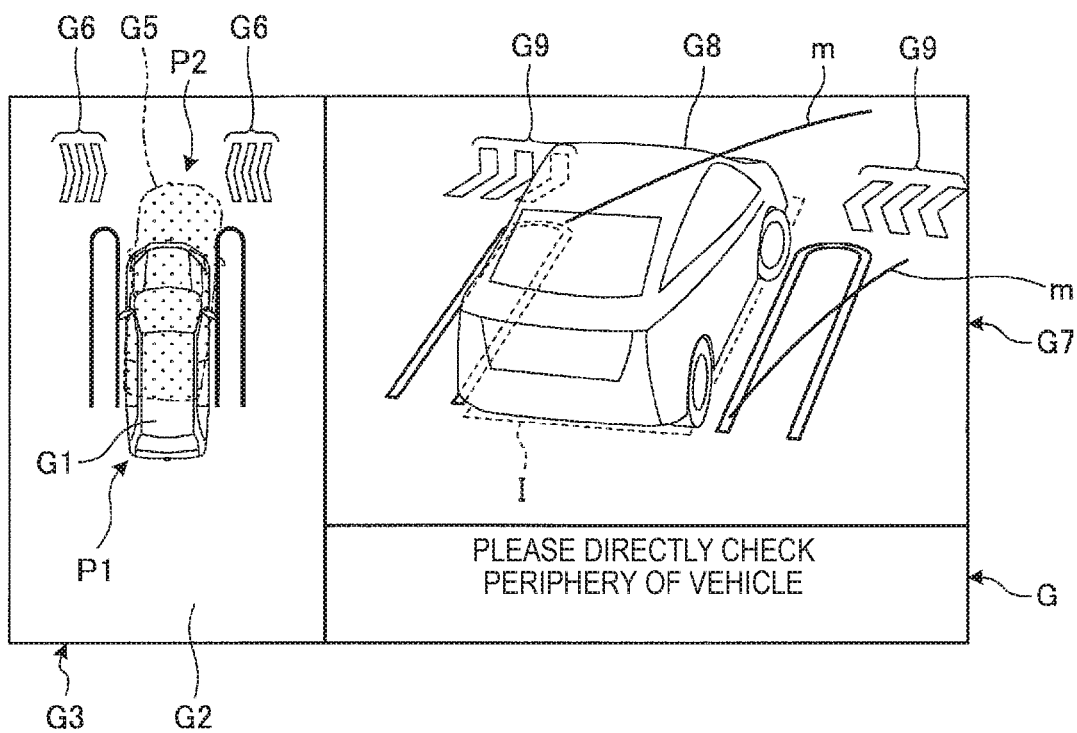
FIG. 14 is an exemplary and schematic diagram illustrating another display screen by the periphery monitoring device according to the second embodiment.

FIGS. 13 and 14 are diagrams illustrating an example of the display screen by a periphery monitoring device of the vehicle 1 according to the second embodiment. In the second embodiment, as illustrated in FIG. 13, the control section 403 causes the display device 8 to display a display screen G including a synthesized image G3 and a three-dimensional image (referred to as a three-dimensional periphery image below) G7 of the vehicle 1 and the periphery of the vehicle. Thus, it is possible to easily recognize the positional relation between the vehicle 1 and an object around the vehicle 1 in more detail, by visually recognizing the three-dimensional periphery image G7 in addition to the synthesized image G3.

Here, the three-dimensional periphery image G7 is a three-dimensional image of the vehicle 1 and the periphery of the vehicle, as described above. In the present embodiment, the three-dimensional periphery image G7 is generated by pasting an image obtained by the image capturing section 15 capturing an image of the periphery of the vehicle 1, onto a bowl-shaped or cylindrical three-dimensional surface. In the present embodiment, as illustrated in FIG. 13, the three-dimensional periphery image G7 includes a three-dimensional vehicle image G8 being a three-dimensional image of the vehicle 1. In the present embodiment, the three-dimensional vehicle image G8 is an image that is configured by a plurality of polygons and shows the three-dimensional shape of the vehicle 1, similarly to the virtual vehicle image G5.

In the present embodiment, the control section 403 displays vehicle position information I that enables the position of the three-dimensional vehicle image G8 to be identified with respect to the road surface in the three-dimensional periphery image G7. For example, the vehicle position information I is information in which the position at which the three-dimensional vehicle image G8 is provided is displayed on the road surface in the three-dimensional periphery image G7, in gray scale or by a line (for example, broken line) that encloses the position at which the three-dimensional vehicle image G8 is provided.

As illustrated in FIG. 14, similar to the first embodiment, the control section 403 displays the approaching object indicator G6 in the periphery image G2 and also displays an approaching object indicator G9 in the three-dimensional periphery image G7. At that time, as illustrated in FIG. 14, it is assumed that the control section 403 displays the approaching object indicator G9 in the three-dimensional periphery image G7, in gray scale. In order to facilitate the grasping of the positional relation between the vehicle image G1 and the surrounding object, the control section 403 does not display the virtual vehicle image G5 in the three-dimensional periphery image G7, but the present disclosure is not limited to this. The control section may display the virtual vehicle image G5 in the three-dimensional periphery image G7.

Figure 15:
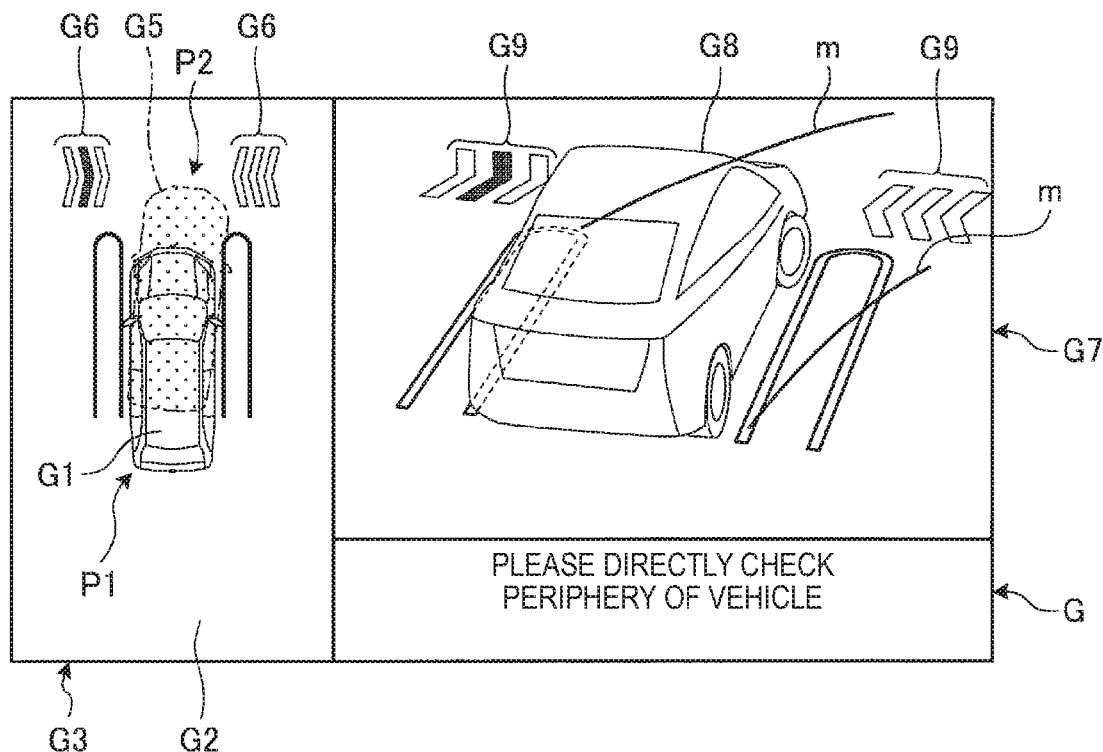
FIG. 15 is an exemplary and schematic diagram illustrating display of an approaching object indicator by the periphery monitoring device illustrated in FIG. 14.
Figure 16:
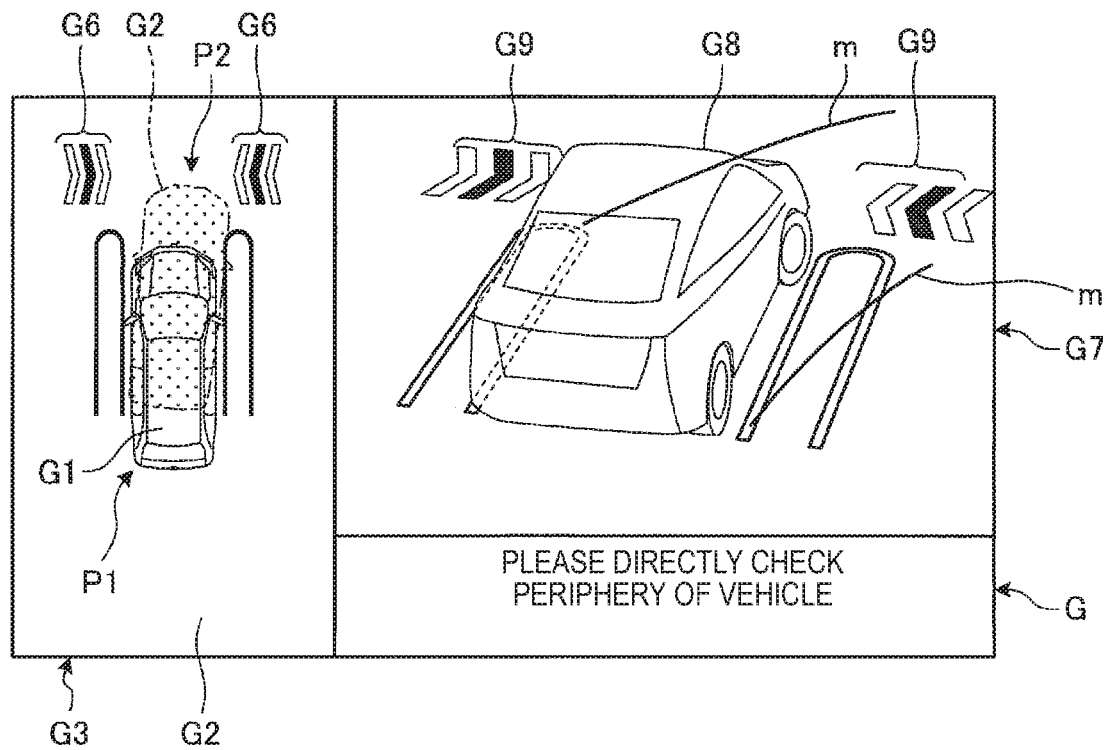
FIG. 16 is an exemplary and schematic diagram illustrating another display of the approaching object indicator by the periphery monitoring device illustrated in FIG. 14.

FIGS. 15 and 16 are diagrams illustrating an example of the display screen by the periphery monitoring device according to the second embodiment. In the present embodiment, when the detection section 402 detects an object approaching the vehicle 1 (for example, an object approaching the vehicle from the left side in the traveling direction of the vehicle 1), as illustrated in FIG. 15, the control section 403 changes the display forms of the approaching object indices G6 and G9 provided in the direction (for example, left side) in which the detected object approaches the vehicle among approaching object indices G6 in the periphery image G2 and approaching object indices G9 in the three-dimensional periphery image G7.

When the detection section 402 detects an object that approaches the vehicle 1 from both the right and left in the traveling direction of the vehicle 1, as illustrated in FIG. 16, the control section 403 changes the colors of the display forms of the approaching object indices G6 and G9 provided in both the right and left in the traveling direction (for example, front) of the vehicle to the yellow color or the like, or causes the approaching object indices G6 and G9 to blink. Alternatively, when the approaching object indices G6 and G9 include a plurality of arrows, the control section 403 may display a plurality of arrows of the approaching object indices G6 and G9 displayed in the direction in which the detected moving object exists, in an animation that changes the display form in order from the arrow farther from the virtual vehicle image G5, to be scrolled.

In the second embodiment, when the detection section 402 is in the operation state and an object approaching the vehicle 1 is not detected, the approaching object indices G6 and G9 are displayed in advance in gray scale or the like. With this setting, it is possible to perform a display that allows the detection section 402 to detect an object approaching the vehicle 1. When an object approaching the vehicle 1 is detected, the display forms of the approaching object indices G6 and G9 are changed. By changing the display form, it is possible to cause the driver of the vehicle 1 to easily recognize that the object approaching the vehicle 1 is detected. In the second embodiment, the control section 403 displays both the virtual vehicle image G5 and the approaching object indices G6 and G9 on the display screen G, but at least the virtual vehicle image G5 may be displayed.

As described above, according to the periphery monitoring device in the second embodiment, it is possible to easily recognize the positional relation between the vehicle 1 and an object around the vehicle 1 in more detail, by visually recognizing the three-dimensional periphery image G7 in addition to the synthesized image G3.

Third Embodiment

A third embodiment is an example in which the surrounding situations of the virtual vehicle image G5 and the vehicle image G1 described above are displayed in a state in which the virtual vehicle image G5 and the vehicle image G1 are more easily recognized. In the following description, the description of components similar to those in the first embodiment will not be repeated.

In the third embodiment, when the detection section 402 detects an object O on a course when the vehicle 1 travels by a predetermined distance at the current steering angle, the control section 403 displays a synthesized image G3 to be enlarged (zoom in) in comparison to a case before the object O is detected. Enlargement of the synthesized image G3 may be performed, for example, by bringing a virtual viewpoint closer to the vehicle image G1. By performing the enlarged display, the driver of the vehicle 1 can easily intuitively recognize that the object O having a possibility of coming into contact with the vehicle 1 is detected, and it is necessary to pay attention to the surrounding situation. Details of the surrounding situation of the vehicle image G1 or the virtual vehicle image G5 are displayed more clearly by the enlarged display. As a result, it is possible to provide the driver of the vehicle 1 with a display that causes the driver to easily check the surrounding situations and easily feel secure.

In the third embodiment, when the synthesized image G3 is displayed in the enlarged manner, the control section 403 performs a shift display in which the display position (for example, display position of the vehicle image G1) is displayed to be shifted in a direction opposite to the turning direction based on the current steering angle. For example, the control section moves the position of the virtual viewpoint in the direction opposite to the turning direction to shift the display of the synthesized image G3. When the enlarged display of the synthesized image G3 is performed in the limited display area of the display device 8, the details of the surroundings of the vehicle image G1 and the virtual vehicle image G5 are easily recognized, but a display range (field of view) in which the vehicle image G1 and the virtual vehicle image G5 are set as the center is narrowed. When the vehicle 1 turns, the vehicle 1 may pass in the direction opposite to the turning direction so long as it can be checked that the vehicle 1 does not come into contact with the object O which has already been detected. Another object may exist in the turning direction. Thus, the control section 403 may perform a display in a wider range by shifting the display position of the vehicle image G1 in the direction opposite to the turning direction and widening the display range (field of view) in the turning direction.

In the third embodiment, when the enlarged display of the synthesized image G3 is performed, and the vehicle is moved away from the object O, the control section 403 may cancel the enlarged display (for example, bring the size back to the display size before the enlargement) and cause the virtual vehicle image G5 not to be displayed. By bringing (zooming out) the vehicle image G1 back to the original display size and causing the virtual vehicle image G5 not to be displayed, a noticeable change occurs in the entire synthesized image G3. Thus, it is possible to perform a display that causes the driver of the vehicle 1 to easily recognize the display end of the virtual vehicle image G5. It is possible to perform a display that easily causes the driver of the vehicle 1 to intuitively recognize that the possibility of contact with an object O is reduced or eliminated. As will be described later, the virtual vehicle image G5 in the middle of being displayed in the enlarged manner may be temporarily caused not to be displayed by an operation of the driver.

Figure 17:
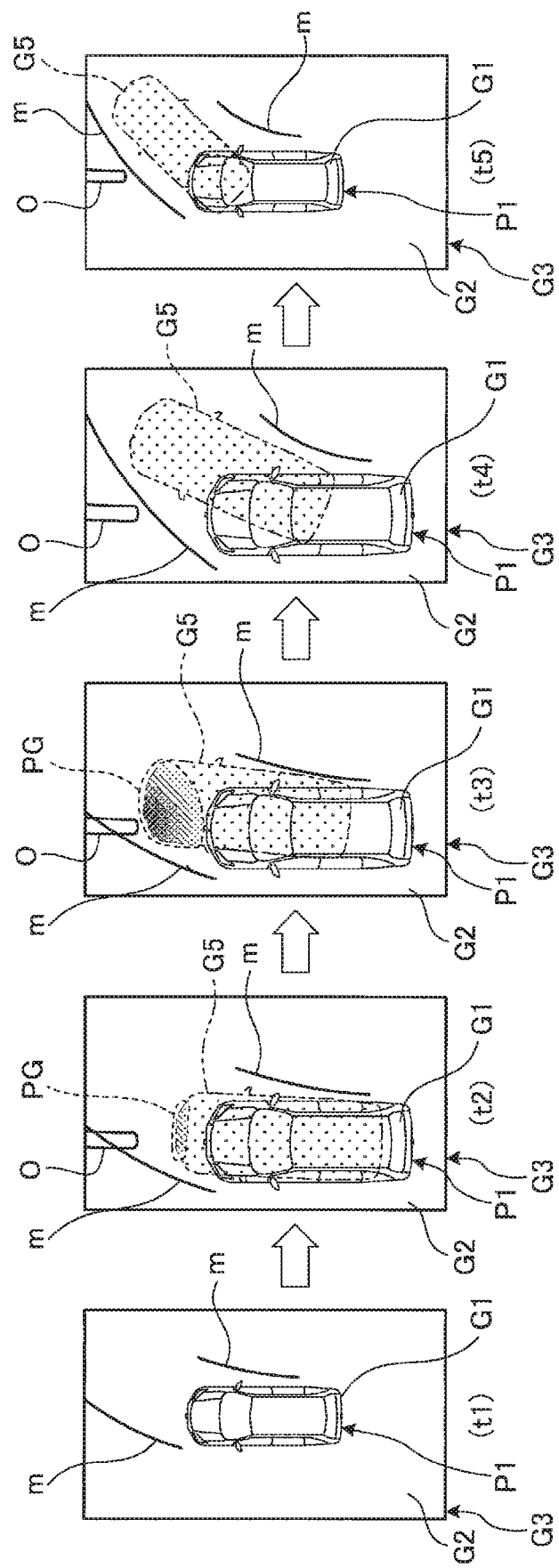
FIG. 17 is an exemplary and schematic diagram illustrating a display screen of a periphery monitoring device according to a third embodiment.

FIG. 17 is a diagram illustrating an example of the display screen by the periphery monitoring device of the vehicle 1 according to the third embodiment. At a time point t1 in FIG. 17, the detection section 402 does not detect an object O on a course when the vehicle 1 travels by a predetermined distance at the current steering angle, and the display state of a normal size before the enlarged display is performed is shown. Before the object is detected on the course, the vehicle image G1 is displayed at the substantially center of the synthesized image G3, in a non-enlarged state.

At a time point t2, the vehicle image G1 (vehicle 1) moves forward from the position at the time point t1. The object O is detected on the course, and the display of the virtual vehicle image G5 is started. In addition, the enlarged display of the vehicle image G1 and the virtual vehicle image G5 is performed. In this case, the enlargement ratio of the synthesized image G3 including the vehicle image G1 and the virtual vehicle image G5 is "2", for example. In this case, the control section 403 brings the virtual viewpoint closer to the vehicle image G1 with the vehicle image G1 as a reference, for example. As a result, the display is changed such that the synthesized image G3 being a bird's-eye view image is zoomed in. At this time, the control section 403 performs the shift display in which the virtual viewpoint is shifted based on the current steering angle of the vehicle 1, which is acquired by the acquisition section 401, in the direction opposite to the turning direction, in a case of FIG. 17, in the left direction in FIG. 17, and the display positions of the vehicle image G1, the virtual vehicle image G5, and the object O, that is, the display position of the synthesized image G3 is changed. By performing the enlarged display processing, it is possible to more easily recognize the surrounding situations of the vehicle image G1 and the virtual vehicle image G5, for example, the distance from the object O. By performing the shift display processing, the display area in the right direction in FIG. 17, which is the turning direction in accordance with the current steering angle in the vehicle image G1 and the virtual vehicle image G5, is expanded, and thus it is possible to perform a display that causes, for example, whether or not another object is in the turning direction to be easily checked.

The control section 403 may set the magnification when the synthesized image G3 (image including the vehicle image G1 and the virtual vehicle image G5) is enlarged to a fixed value as described above or may change the magnification in accordance with the distance between the object O and the virtual vehicle image G5 (vehicle image G1). For example, as the virtual vehicle image G5 (vehicle image G1) is farther from the object O, the enlargement ratio may be reduced. As the enlargement ratio is reduced, the wider the field of view can be secured. Thus, it is possible to perform a display that causes the entire surrounding situation of the vehicle image G1 and the virtual vehicle image G5 to be more easily grasped. As the virtual vehicle image G5 (vehicle image G1) becomes closer to the object O, the enlargement ratio increases. In this case, although the field of view is narrowed, the display is enlarged. Thus, it is possible to perform a display that causes the latest situation of the vehicle image G1 or the virtual vehicle image G5 to be more easily grasped than when the virtual vehicle image is located far from the object. As a result, the driver can easily determine the steering direction and the steering angle amount for avoiding the contact with the object O, while paying attention to the object O.

The control section 403 may change the magnification when enlarging the synthesized image G3, in accordance with the vehicle speed of the vehicle 1. For example, when the vehicle approaches the object O at a low speed (for example, when the vehicle approaches a wall or the like for parking), the enlargement ratio increases as the vehicle becomes closer to the object O, and thus the positional relation with the object O is easily recognized in more detail. When the vehicle 1 travels at a predetermined speed or higher (for example, 12 km/h or higher) at a position far from the object, the enlargement ratio is reduced, and the synthesized image G3 with a wide field of view is displayed. In this case, it is possible to secure a wider field of view and to perform a display that makes it easier to grasp the situation in the traveling direction than at the low speed (when the enlargement ratio is large) and to give a sense of security.

At the time point t2, the distance between the object O and the virtual vehicle image G5 is equal to or smaller than a predetermined value, and a state where the display form of the partial image PG of the virtual vehicle image G5, which has a possibility of coming into contact with the object O, is changed to the first display form (for example, red) that implies the contact with the object O is shown. In this case, it is possible to perform a display that makes it easy for the driver to recognize which position of the vehicle 1 has a possibility of coming into contact with the object O, when the vehicle 1 travels at the current steering angle.

A time point t3 in FIG. 17 is similar to the case of non-enlargement described with reference to FIG. 10 and corresponds to an example in which the redness of the partial image PG displayed in red in the virtual vehicle image G5 increases by reducing the distance from the object O, and the driver is caused to easily recognize the approach of the object O. The time point t3 shows a state where, since the virtual vehicle image G5 approaches the object O in comparison to at the time point t2, the position on the virtual vehicle image G5, at which the virtual vehicle image G5 and the object O may come into contact with each other, is more narrowed down, and the position having a high possibility of the contact is displayed with the increased redness. As described above, the synthesized image G3 is displayed in the enlarged manner, and the display form of the partial image PG having a high possibility of the contact is changed. Thus, it is possible to cause the driver to recognize the approaching state of the object O in more detail.

At a time point t4, a state in which a guide line m indicating the predicted movement trajectory of the vehicle image G1 is moved to the front of the object O by changing the steering angle is displayed. In this case, a form in which the virtual vehicle image G5 becomes farther from the object O due to the course change by changing the steering angle, and the state transitions to a state (passable state) in which the contact is avoided is shown. Also in this case, since the synthesized image G3 is displayed in the enlarged manner, a display that makes it easier for the driver to recognize that the possibility that the object O and the virtual vehicle image G5 (vehicle image G1) come into contact with each other is reduced is obtained. At the time point t4, a state where the distance between the object O and the virtual vehicle image G5 exceeds the predetermined value by changing the steering angle and the contact is avoided is shown. In this case, the display color of the partial image PG of the virtual vehicle image G5 that has been displayed at the time point t3 is changed from the first display form (for example, red) that implies the contact to the second display form (for example, white) that implies the contact avoidance. Even though the display form of the partial image PG of the virtual vehicle image G5 is changed, it becomes easier for the driver to recognize that the contact with the object O can be avoided by the current steering angle (changed steering angle).

A time point t5 corresponds to a display example in which the contact with the object O detected by the detection section 402 is avoided by maintaining the current steering angle (changed steering angle), and it is possible to continue traveling. In this case, the enlarged display of the synthesized image G3 is canceled. In this case, it is possible to display the periphery of the vehicle image G1 and the virtual vehicle image G5 in a wide range (wide field of view). The control section 403 cancels the enlarged display of the synthesized image G3 and thus reduces the synthesized image (the same enlargement ratio of "1" as at the time point t1). As a result, the driver can more clearly recognize that the contact with the object O can be eliminated by changing the steering angle, and that the contact is eliminated. By continuing to display the virtual vehicle image G5, it becomes easier to continue traveling while paying attention to the possibility of contact with another object in a further area. In this state, the distance between the object O and the virtual vehicle image G5 is lengthened beyond a predetermined value. Thus, the partial image PG of the virtual vehicle image G5 is displayed in the second display form (for example, white) that implies the contact avoidance. Thus, a display that causes the driver to easily recognize that the contact with the object O can also be avoided by the display color of the partial image PG of the virtual vehicle image G5 is obtained. In this case, the shift display processing may be set to be canceled or may be set not to be canceled.

At the time point t5, when the speed of the vehicle 1 is equal to or faster than a predetermined speed, for example, 12 km/h, or when a predetermined period has elapsed after the contact with the object O is avoided, for example, when, after a predetermined time has elapsed (for example, after two seconds have elapsed), the vehicle travels by a predetermined distance (for example, 5 m), the display of the virtual vehicle image G5 may be ended and caused not to be displayed. That is, the time point t5 may show that an object having a possibility of the contact does not exist on a course when the vehicle 1 travels by a predetermined distance at the current steering angle (changed steering angle). When a new object is detected on the course, the virtual vehicle image G5 is displayed and the enlarged display, the shift display, or the like is performed on the synthesized image G3, as shown at the time point t2.

Figure 18:
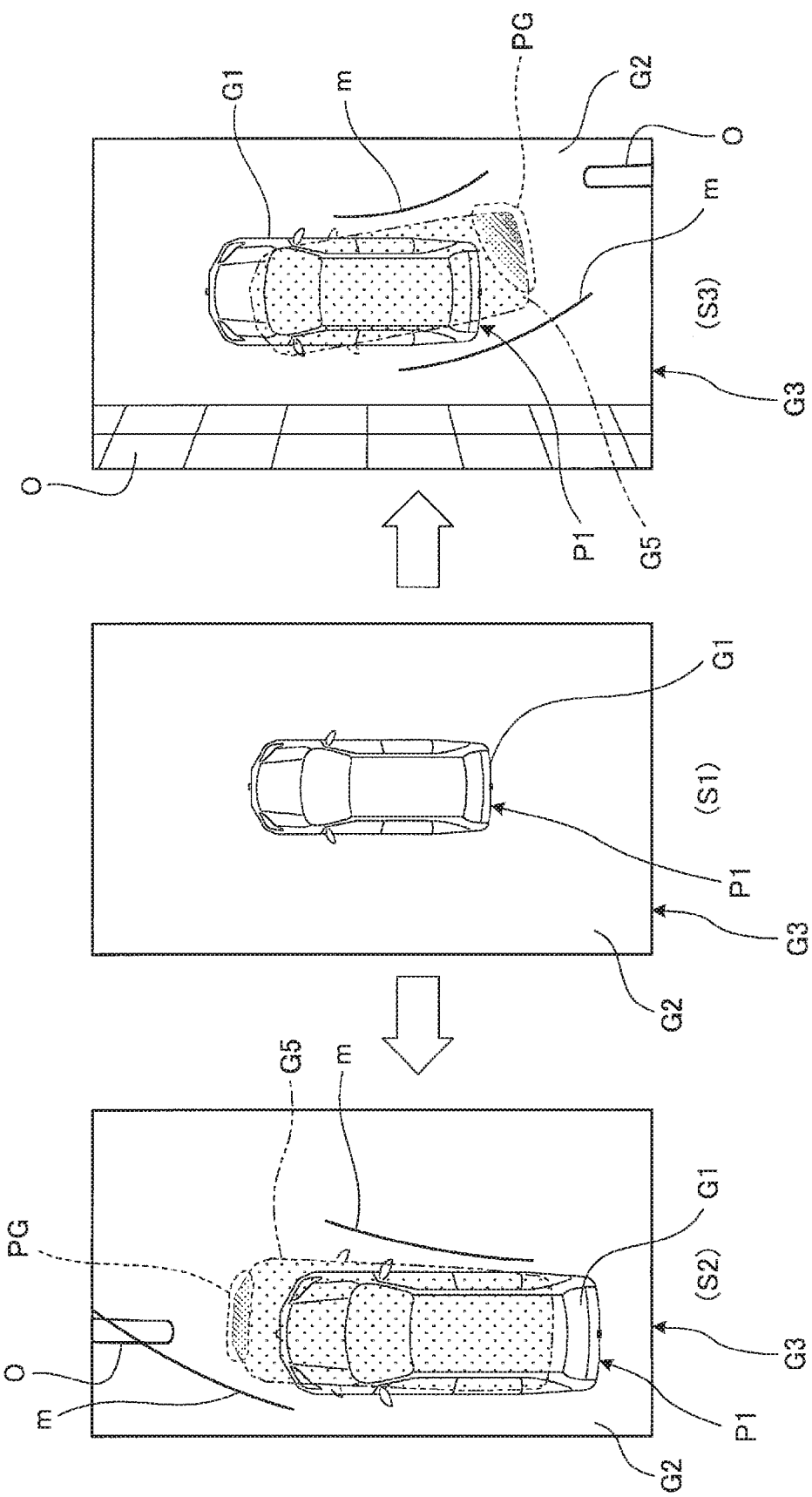
FIG. 18 is an exemplary and schematic view illustrating that the display form of the display screen by the periphery monitoring device according to the third embodiment is changed between when the vehicle is in a state of being movable backward and other times.

FIG. 18 illustrates an example in which the display form of the synthesized image G3 (image including the vehicle image G1, the virtual vehicle image G5, and the like) is changed in accordance with the shift state of the gear shift operation section 7 of the vehicle 1.

A scene S1 shown at the center is a state (enlargement ratio "1") where the synthesized image G3 (image including the vehicle image G1) is not enlarged-displayed in a non-detection case in which the detection section 402 does not detect the object O on the course when the vehicle 1 travels by the predetermined distance at the current steering angle. A scene S2 is a state where, when the gear shift operation section 7 is in the forward (D) range or the parking (P) range, that is, when the vehicle 1 is not in a state where, the vehicle 1 can travel backward, the vehicle, for example, which is steered to the right is about to turn right based on the current steering angle. The scene S2 is an example in which the detection section 402 detects the object O on the course when the vehicle 1 travels by the predetermined distance at the current steering angle. As described above, when the vehicle travels forward by a right turn, an area to which the driver needs to pay attention is an area of the front left end portion of the vehicle in the direction opposite to the turning direction, and, in particular, the relative distance to the object O. Thus, in such a case, as illustrated in FIG. 17, the control section 403 displays the synthesized image G3 in the enlarged manner at a high enlargement ratio, for example, an enlargement ratio "2". In addition to this, it is necessary that the driver pays attention to another object having a possibility of being in the turning direction. Thus, the control section 403 performs the shift display of shifting the display position of the synthesized image G3 in the direction opposite to the turning direction determined by the steering angle. In this case, the control section 403 may determine the shift amount such that the detected object O, the vehicle image G1, and the virtual vehicle image G5 fit within the display area, or may perform processing at a predetermined enlargement ratio such that the detected object O, the vehicle image G1, and the virtual vehicle image G5 fit. As a result, the driver of the vehicle 1 can continue traveling while paying attention to a wide area in the turning direction, while checking the image in which the distance (contact/non-contact) with the object O in front is enlarged.

A scene S3 is a state where, when the gear shift operation section 7 is in the retreat (R) range, that is, when the vehicle 1 is in a state where the vehicle can travel backward, the vehicle 1, for example, which is steered to the right is about to retreat while turning right based on the current steering angle. The scene S3 is an example in which the detection section 402 detects an object O (for example, pillar) on a course when the vehicle 1 travels (retreats) by a predetermined distance at the current steering angle, and an object O (for example, wall) is detected on the left side of the vehicle 1. As described above, when the vehicle retreats by a right turn, an area to which the driver needs to pay attention is an area at the front left end portion of the vehicle in the direction opposite to the turning direction, and an area of the rear right end portion of the vehicle in the turning direction. That is, it is necessary to pay attention to the diagonal areas before and after the vehicle image G1 (virtual vehicle image G5). Therefore, as illustrated in the scene S3 in FIG. 18, the control section 403 displays the synthesized image G3 in the enlarged manner by setting the enlargement ratio to, for example, "1.5", which is smaller than that during forward movement. When the vehicle 1 can travel backward, the shift display processing is set not to be performed, and the left and right display areas of the vehicle image G1 are secured substantially evenly. By suppressing the enlargement ratio and setting the shift display processing not to be performed, as described above, it is possible to perform a display that makes it easy to move backward while checking the periphery (left side and right side) of the vehicle image G1 (virtual vehicle image G5) in a wider range (wide field of view) than when traveling forward.

As described above, when an object is detected on the course when the vehicle 1 travels by a predetermined distance at the current steering angle, there is an effect that it is easy to pay attention to an object having a possibility of contact, by displaying the virtual vehicle image G5 with the position of the vehicle image G1 as a reference and further moving the virtual vehicle image G5 along the course. The driver who once recognizes the object on the course may feel annoyed when the virtual vehicle image G5 is continuously displayed. When the distance between the object and the virtual vehicle image G5 is reduced, it may be difficult to check the details of the periphery of the object by the virtual vehicle image G5. When the partial image PG is changed to the emphasized color by the approach to the object, it may be difficult to check the details of the periphery of the object. Thus, the control section 403 can temporarily set the virtual vehicle image G5 not to be displayed. For example, as illustrated in a scene S4 in FIG. 19, the control section 403 may display a non-display switch 30 (for example, ghost off switch) of the virtual vehicle image G5 to be superimposed on the position related to the virtual vehicle image G5 being displayed, for example, on the virtual vehicle image G5. When the driver determines that the display of the virtual vehicle image G5 is unnecessary, for example, the driver already grasps the existence of the object O, or recognizes the relative positional relation between the object O and the virtual vehicle image G5 (vehicle image G1, vehicle 1). In this case, it is possible to temporarily set the virtual vehicle image G5 not to be displayed and to improve the visibility around the object O, by operating (pushing) the non-display switch 30. The display position of the non-display switch 30 may be any position on the display screen G or may be provided at a position other than the display screen G. The non-display switch 30 is desired to be provided at a position related to the virtual vehicle image G5. For example, it is possible to perform an operation of setting the virtual vehicle image G5 not to be displayed in a state where the driver recognizes that the virtual vehicle image G5 is provided, that is, that an object that is likely to come into contact with the vehicle exists, by displaying the non-display switch 30 to overlap the virtual vehicle image G5. Thus, it is possible to improve the visibility around the object while effectively using the virtual vehicle image G5.

Figure 19:
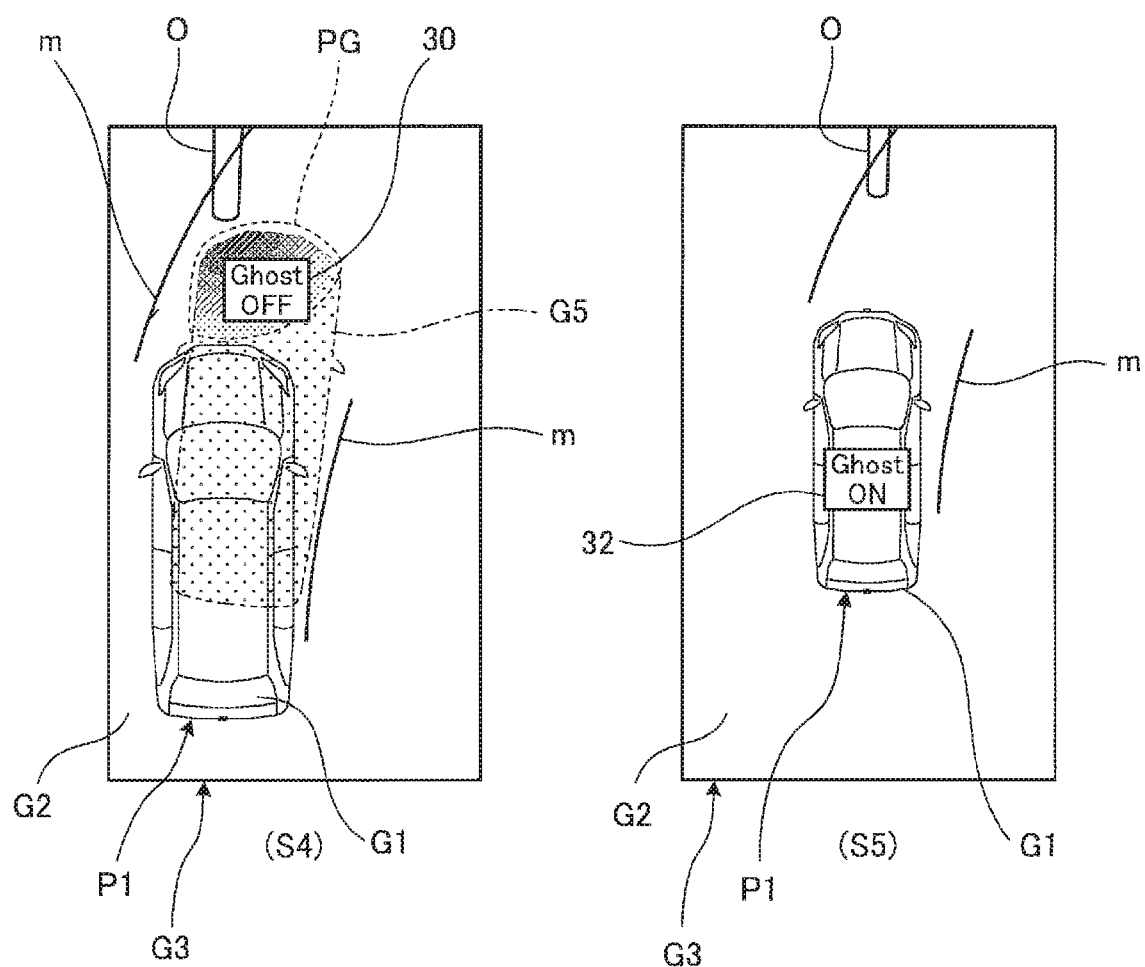
FIG. 19 is an exemplary and schematic diagram illustrating a display screen showing that the virtual vehicle image can be caused not to be displayed and to be displayed again by the periphery monitoring device according to the third embodiment.

By operating (pushing) the non-display switch 30, the enlarged synthesized image G3 (image including the vehicle image G1 and the virtual vehicle image G5) may be brought back to a non-enlarged state as illustrated in the scene S5 in FIG. 19, or only the enlarged virtual vehicle image G5 itself may be set not to be displayed. When the shift display processing is performed during the enlarged display, the shift display processing is also canceled. The vehicle image G1 is brought back to the position at the substantially center of the synthesized image G3 and back to a display in which the entire periphery of the vehicle image G1 can be substantially uniformly checked.

When the virtual vehicle image G5 is set not to be displayed by the operation of the non-display switch 30, and a predetermined condition is satisfied, the non-display of the virtual vehicle image G5 is canceled. That is, when the object continues to exist on the course when the vehicle 1 travels by a predetermined distance at the current steering angle, the virtual vehicle image G5 is displayed again. For example, when it is checked that the vehicle 1 is stopped, for example, when the shift state is changed by the gear shift operation section 7, for example, when "shift P" is selected, the non-display is set by the operation of the non-display switch 30. Thus, after a predetermined period of time has elapsed, for example, when a predetermined time has elapsed or when the vehicle has traveled by a predetermined distance, the virtual vehicle image G5 is displayed again. That is, it is possible to cause the driver to recognize again the existence of an object that is likely to come into contact with the vehicle. As described above, even when the non-display switch 30 is operated, the virtual vehicle image G5 is brought back to a displayable state by satisfying the predetermined condition. As a result, for example, it is possible to avoid an occurrence of a situation in which the virtual vehicle image G5 is permanently in the not-display state.

An example in which the non-display switch 30 is usable under a condition that the virtual vehicle image G5 is displayed is described. The non-display switch 30 may be used from a stage before the virtual vehicle image G5 is displayed. For example, there is a case where the driver is familiar with the situation behind him, such as a case of parking. The driver may also already know a timing at which the virtual vehicle image G5 is displayed. In such a case, the display of the virtual vehicle image G5 may be temporarily canceled before the virtual vehicle image G5 is displayed. Even in this case, the non-display of the virtual vehicle image G5 by the operation of the non-display switch 30 is temporary. When the predetermined condition is satisfied, the virtual vehicle image G5 is brought back to the displayable state, and thereby it is possible to avoid an occurrence of a situation in which the virtual vehicle image is permanently set not to be displayed.

When the virtual vehicle image G5 is set not to be displayed by the operation of the non-display switch 30, as illustrated in the scene S5 in FIG. 19, a return switch 32 (for example, ghost on switch) of enabling the re-display of the virtual vehicle image G5 to be performed may be provided only during a non-display period of the virtual vehicle image G5. The return switch 32 can be displayed to be superimposed, for example, on the vehicle image G1, for example, from when the virtual vehicle image G5 is set not to be displayed until the shift is changed by the gear shift operation section 7. By providing the return switch 32, it is possible to bring back the virtual vehicle image G5 in the non-display state at a desired timing and to easily restart the check of the surrounding situation using the virtual vehicle image G5. The return switch 32 may be displayed at any position on the display screen G or may be provided at a position other than the display screen G. It is possible to smoothly perform a work for re-displaying the virtual vehicle image G5 by providing the return switch 32 at a position related to the vehicle image G1. In the case of scene 5, the virtual vehicle image G5 is set not to be displayed, and the vehicle image G1 is brought back to the non-enlarged state. In another embodiment, an enlargement switch for enlarging and displaying the synthesized image G3 may be provided separately from the return switch 32. In this case, it is possible to perform a display in which it is easy to check the positional relation between the vehicle image G1 and the object O in a state where the virtual vehicle image G5 is set not to be displayed.

As described above, according to the periphery monitoring device in the third embodiment, the enlargement ratio of the synthesized image G3 (the image including the vehicle image G1, the virtual vehicle image G5, and the like) or whether to perform the shift display processing is determined in accordance with the traveling direction of the vehicle 1. It is possible to set the virtual vehicle image G5 to be displayed again or temporarily not to be displayed, by the operation of the driver. As a result, it is possible to realize a display that enables the check of the surroundings suitable for the situation at that time and it is easy to improve the sense of security of the driver, in accordance with the traveling state of the vehicle 1 or the operation of the driver.

Figure 20:
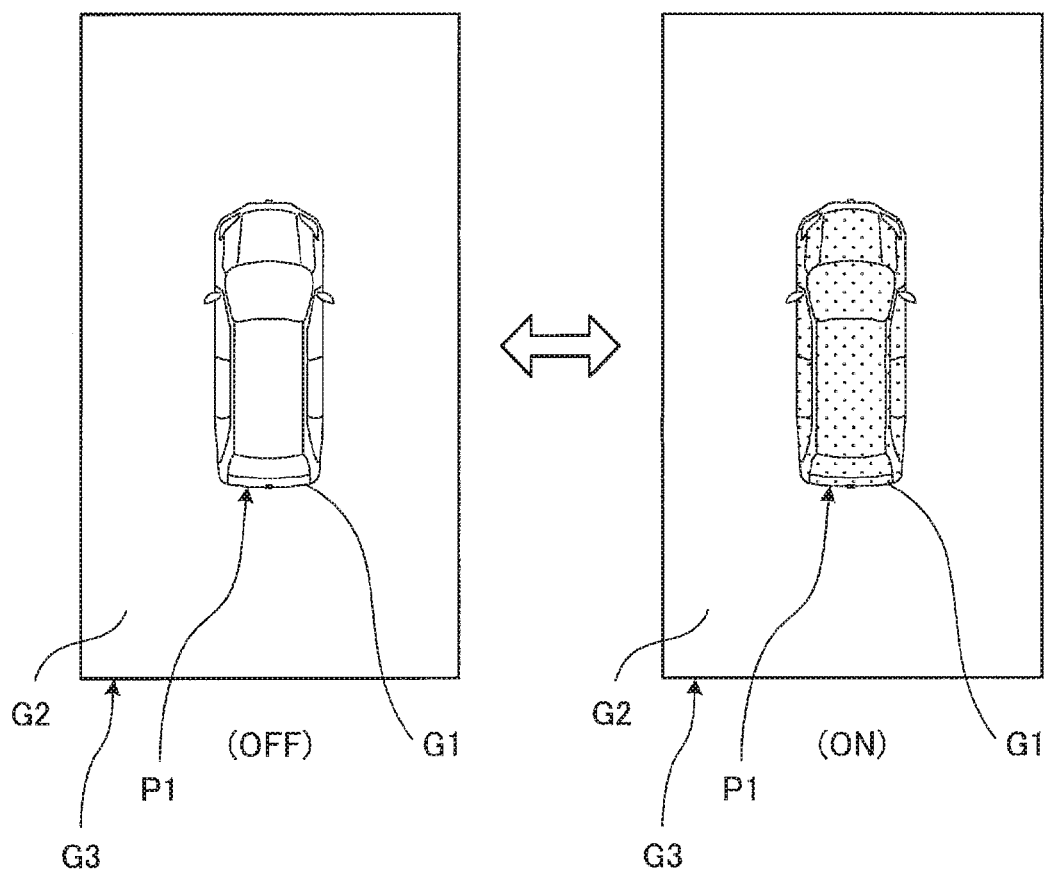
FIG. 20 is an exemplary and schematic diagram illustrating a display screen corresponding to an operation state of a main switch (operation switch) for selecting whether or not to display the vehicle image in the periphery monitoring device in the present embodiment.

In the above-described embodiment, an example in which the virtual vehicle image G5 starts to be displayed when the object O is detected on the course where the vehicle 1 travels by a predetermined distance at the current steering angle is described. In another embodiment, the CPU 14a may perform determination based on the operation state of a virtual display main switch 10a (operation switch) of performing switching whether or not to display the virtual vehicle image G5 in the synthesized image G3 (bird's-eye view image). As illustrated in FIG. 3, the main switch 10a may be provided, for example, as a portion of the operation input section 10 (touch sensor type switch) set in the monitor device 11, or as a separate mechanical physical switch. When the CPU 14a does not detect the object O on the course when the vehicle 1 travels by a predetermined distance at the current steering angle and the virtual vehicle image G5 can be displayed on the display device 8 by operating the main switch 10a (the main switch is ON), the vehicle image G1 is displayed in a form different from that when the main switch 10a is OFF. For example, as illustrated in FIG. 20, it is displayed that the virtual vehicle image G5 is in a display standby state, by changing the display color of the vehicle image G1 from the vehicle color corresponding to the vehicle 1 to another color (for example, green) or displaying the vehicle image G1 in a blinking manner. The display form in this case may be changed so long as the driver or the like can recognize that the virtual vehicle image G5 is in the display standby state. The display brightness of the vehicle image G1 or the display transmittance may be changed. The display form may be appropriately changed. When the display form of the vehicle image G1 is changed based on the main switch 10a being in the ON state, a message for a notification that the virtual vehicle image G5 is in the display standby state may be displayed in the synthesized image G3 and other display areas. Alternatively, a voice or a notification sound may be output such that the driver can recognize the message. As described above, since the display form of the vehicle image G1 is changed based on the operation state of the main switch 10a, when the object O is detected on the course, it is possible to perform a display that causes the driver to easily recognize that a notification of the existence of the object O is performed by the virtual vehicle image G5 which is immediately displayed and easily causes the driver to feel secure. In a case of the non-display switch 30 described with reference to FIG. 19, even when the virtual vehicle image G5 is set not to be displayed by the operation of the non-display switch 30, the virtual vehicle image G5 is brought back to the displayable state if the predetermined condition is satisfied. When the main switch 10a is OFF, the virtual vehicle image G5 is set not to be displayed regardless of whether or not the object O is on the course. In this case, it is possible to set the virtual vehicle image G5 not to be displayed, in accordance with the request of the driver and to provide a simple synthesized image G3.

In the third embodiment, an example in which the control section 403 displays (zooms in) the synthesized image G3 in the enlarged manner in comparison to before the object O is detected, such that the synthesized image is displayed in a state where the surrounding situations and the like of the vehicle image G1 and the virtual vehicle image G5 are easily recognized is described. When the driver actually drives the vehicle 1, it is necessary to steer the vehicle 1 while moving such that the vehicle can safely and smoothly pass by an object O around the vehicle. That is, it is necessary to steer the vehicle such that the virtual vehicle image G5 can secure a necessary and sufficient margin distance (safety margin) with respect to the object O. When the margin distance is insufficient, there is a problem that the object O is brought too close to or in contact with the object O. On the other hand, when the margin distance is taken more than necessary, there is a problem that the vehicle deviates from the appropriate travel course. Further, in this case, the margin distance may decrease on the side opposite to the direction in which the margin distance is taken into consideration, a possibility of contact may increase on the opposite side, or escape from a narrow space may not be possible. As described above, securing an appropriate margin distance may depend on the experience, the skill, and the like of the driver. When it is not possible to set the appropriate margin distance, the driver may feel uneasy. In addition, an attachment error may be provided in the image capturing section 15 that captures an image used to generate the synthesized image G3, or an error may occur at the display position of the periphery image G2 due to the inclination of the road surface or the like. Even in such a case, it is not possible to set the appropriate margin distance, which may cause the driver to feel uneasy.

Therefore, when displaying the virtual vehicle image G5, the control section 403 performs margin enlargement processing of enlarging and displaying at least one of the length of the virtual vehicle image G5 in the vehicle length direction and the length thereof in the vehicle width direction in comparison to the corresponding length of the vehicle image G1 which is current being displayed. In this case, the margin enlargement ratio may be determined in advance by experiments or the like for each vehicle type, and may be set to, for example, 1.3 times the vehicle image G1 displayed corresponding to the size of the vehicle 1. The margin enlargement ratio is an example, and the driver or the like may be allowed to change the setting as appropriate. The margin enlargement processing is processing of enlarging only the virtual vehicle image G5 independently from the vehicle image G1 and the periphery image G2 displayed in the synthesized image G3.

Figure 21:
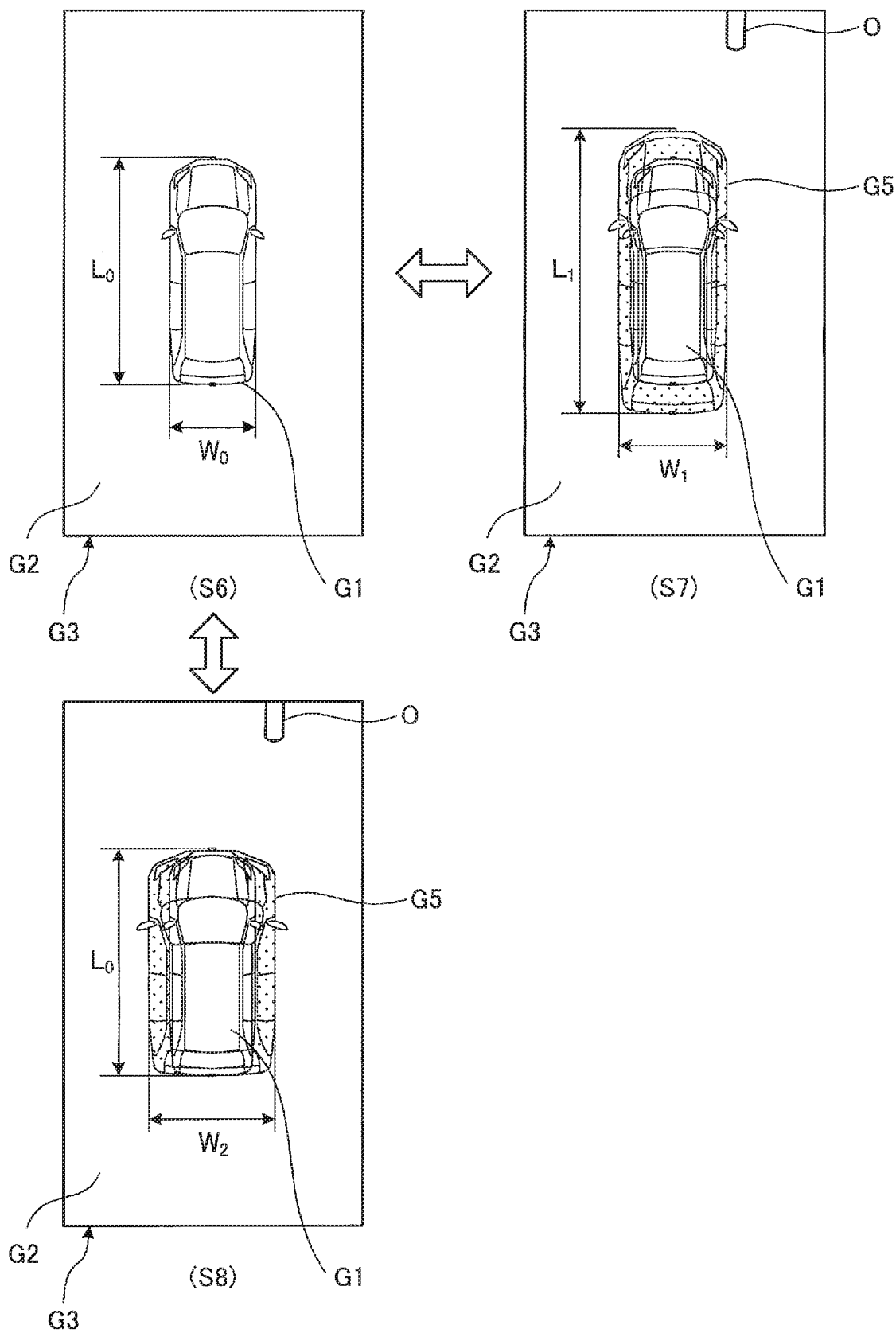
FIG. 21 is an exemplary and schematic diagram illustrating a display image showing that the size is changed when the virtual vehicle image is displayed, to secure a margin distance (safety margin) for an object (for example, obstacle), in the periphery monitoring device in the present embodiment.

FIG. 21 is an exemplary and schematic diagram illustrating that the margin enlargement processing for the virtual vehicle image G5 is performed on the vehicle image G1 being displayed. A scene S6 illustrated in FIG. 21 is a state in which only the vehicle image G1 is displayed in the synthesized image G3. That is, the vehicle image G1 and the periphery image G2 are displayed at the same enlargement ratio.

When the virtual vehicle image G5 is displayed when the object O is detected on the course when the vehicle 1 travels by a predetermined distance at the current steering angle, as illustrated in a scene S7, the control section 403 enlarges at least one (both in a case of the scene S7 in FIG. 21) of the length $L_1$ of the virtual vehicle image G5 in the vehicle length direction and the length Wi in the vehicle width direction based on a predetermined enlargement ratio. For example, when the length of the vehicle image G1 in the vehicle length direction before the margin enlargement processing is set as $L_0$, the length of the virtual vehicle image G5 in the vehicle length direction is enlarged to a length $L_1$, for example, 1.3 times. Similarly, when the length of the vehicle image G1 in the vehicle width direction before the margin enlargement processing is set as $W_0$, the length of the virtual vehicle image G5 in the vehicle width direction is enlarged to a length $W_1$, for example, 1.3 times. In this case, a distance relation between the vehicle image G1 and the object O in the periphery image G2 is displayed so as to substantially correspond to the actual distance relation. The virtual vehicle image G5 is displayed in the enlarged manner in the vehicle length direction and the vehicle width direction in comparison to the vehicle image G1. Thus, when the virtual vehicle image G5 moves so as not to come into contact with the object O, the virtual vehicle image G5 is displayed in a state where a predetermined safety margin is included (considered). As a result, if the driver determines the steering angle such that the guide line m (see FIG. 12 and the like) does not come into contact with the object O, a state where the safety margin is appropriately secured is realized regardless of the experience or the skill of the driver, the attachment state of the image capturing section 15, the inclination state of the road surface, and the like. That is, when the vehicle passes by the object O to avoid the object O, the inconvenience that the vehicle is too close to the object O or too far away from the object O is avoided, and thus it is possible perform a display that causes the driver to easily feel secure.

When the control section 403 performs the margin enlargement processing, an enlargement base point in the vehicle length direction may be set to, for example, the center position of the vehicle image G1 (vehicle 1) in a front-rear direction. Similarly, an enlargement base point in the vehicle width direction may be set to, for example, the center position of the vehicle image G1 (vehicle 1) in the vehicle width direction. When enlargement is performed in the vehicle length direction and the vehicle width direction as in the scene S7, the enlargement base point may be set to the center position of the vehicle image G1 (vehicle 1) in the front-rear direction.

For example, when the object O is in the right front of the vehicle image G1 (vehicle 1), and the vehicle image G1 (vehicle 1) is turned right while avoiding the object O, it is possible to avoid the object O at least if the margin distance between the left front corner portion and the object O in the vehicle image G1 (vehicle 1) can be secured. When the vehicle 1 moves forward and turns, the safety margin in the vehicle length direction tends to be easily recognized, but the safety margin in the vehicle width direction tends to be harder to be recognized than in the length direction of the vehicle 1. Thus, in the margin enlargement processing when the vehicle image G1 (vehicle 1) is turned while avoiding the object O, only the length in the vehicle width direction may be enlarged, as illustrated in a scene S8 in FIG. 21. That is, the length of the virtual vehicle image G5 in the vehicle length direction is kept to be the length $L_0$ by maintaining the length $L_0$ of the vehicle image G1 in the vehicle length direction before the margin enlargement processing. The length in the vehicle width direction is set to, for example, a length $W_2$ which is 1.3 times larger than the length $W_0$ of the vehicle image G1 in the vehicle width direction before the margin enlargement processing. As a result, it is possible to suppress an excessive safety margin from being set around the vehicle image G1 (vehicle 1) (in the front-rear direction) when turning.

When the vehicle image G1 (vehicle 1) moves forward, the control section 403 may perform margin enlargement processing in the vehicle length direction only on the front of the virtual vehicle image G5. Similarly, when the vehicle image G1 (vehicle 1) moves backward, the control section 403 may perform the margin enlargement processing in the vehicle length direction only on the rear side of the virtual vehicle image G5. The safety margin in the vehicle width direction may be provided only in a required direction, in accordance with the traveling direction (turning direction) of the vehicle.

When the control section 403 performs the margin enlargement processing of the virtual vehicle image G5, the virtual vehicle image G5 may be enlarged to the target size in an instant, but it is desired to gradually perform the enlargement processing in order to make it easier for the driver to recognize that the margin enlargement process has been performed. When the margin enlargement processing of the virtual vehicle image G5 is performed, the virtual vehicle image G5 may be enlarged to the target size while moving on the course when the vehicle 1 travels by a predetermined distance. It is desired to start moving of the virtual vehicle image G5 after the margin enlargement processing is completed, in order to make it easier for the driver to recognize that the margin enlargement process has been performed.

As illustrated in FIG. 17 and the like, when enlarging and displaying the synthesized image G3, the control section 403 performs the margin enlarging processing on the virtual vehicle image G5 after the enlarging processing of the synthesized image G3 is completed. The control section 403 may simultaneously perform the margin enlarging processing of the virtual vehicle image G5 when performing the enlargement processing of the synthesized image G3. In this case, the virtual vehicle image G5 is enlarged at an enlargement ratio different from the vehicle image G1 and the periphery image G2.

When performing the margin enlargement processing on the virtual vehicle image G5, the control section 403 may cause the display form of the virtual vehicle image G5 to differ from that when the margin enlargement processing is not performed. For example, the control section may cause the driver to recognize that the margin enlargement processing is performed, by changing the display color or performing a blinking display.

In the above-described embodiment, an example in which the virtual vehicle image G5 is displayed when the object O is detected on the course when the vehicle 1 travels by a predetermined distance, and the margin enlargement process is performed at that time is described. In a modification example, the virtual vehicle image G5 may be displayed at any timing by an operation of the driver using the main switch 10a or the like, regardless of whether or not the object O (obstacle) exists. Then, at that time, the margin enlargement processing may be performed.

In the above-described embodiment, an example in which processing of enlarging the synthesized image G3 is performed, and the margin enlarging processing of G5 is further performed is described. In another embodiment, the enlargement processing of the synthesized image G3 may not be performed, and only the margin enlargement processing of the virtual vehicle image G5 may be performed. Also in this case, it is possible to obtain a similar effect of performing a display that appropriately secures the margin distance (safety margin) from the object O on the course displayed in the synthesized image G3.

Modification Example

Figure 22:
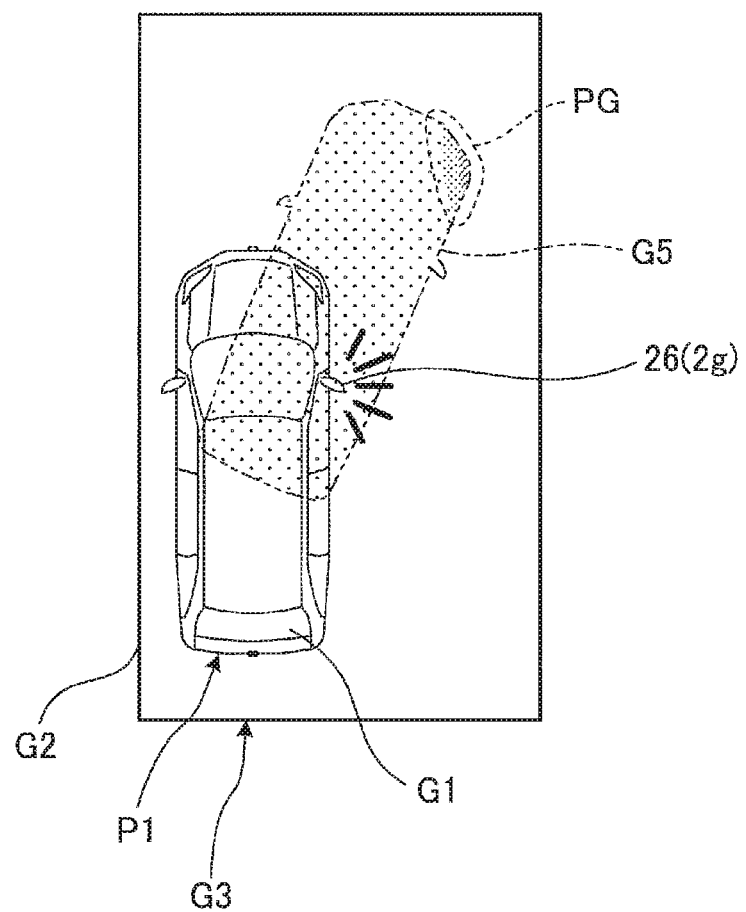
FIG. 22 is an exemplary and schematic diagram illustrating a display screen by a periphery monitoring device according to a modification example.

In the above-described embodiments, the example in which the virtual vehicle image G5 is displayed when the object O is detected on the course where the vehicle 1 travels by a predetermined distance at the current steering angle is described. In a modification example illustrated in FIG. 22, the virtual vehicle image G5 may be displayed when the direction indicator 26 (see FIG. 3) is used, regardless of the steering angle. For example, when the vehicle goes out from the area outside the road to the road, the driver operates the direction indicator 26 before determining the steering angle by operating the steering section 4 (steering wheel). That is, the operation direction of the steering section 4 can be estimated in advance. Thus, when the direction indicator 26 is operated, the acquisition section 401 searches for an object between the steering angle "0" (neutral position) and the maximum steering angle in a direction indicated by the direction indicator 26. That is, the course is sequentially set and the object is searched, in an area having a possibility of the vehicle 1 traveling. As a result, when an object is detected, as illustrated in FIG. 22, a path including the detected object is set regardless of the current steering angle, and the virtual vehicle image G5 is moved from the vehicle image G1 in accordance with the path. Then, a display for stopping the virtual vehicle image G5 at the contact position with the object or the position immediately before the contact position is performed. In this case, as described above, the vehicle image G1 and the virtual vehicle image G5 are displayed in the enlarged manner, and the shift display processing is performed in the direction opposite to the direction indicated by the direction indicator 26. The display color of the partial image PG may be changed to, for example, red in accordance with the distance between the virtual vehicle image G5 and the object.

For example, when the vehicle goes to the road through a gap between the guardrails provided on the road side, it is necessary to determine the steering angle so as not to come into contact with the end portion of the guardrail. As in the display example illustrated in FIG. 22, before the steering angle is determined by the operation of the steering section 4, the virtual vehicle image G5 starts moving, and the display of the virtual vehicle image G5 is fixed at the contact position with the detected object (for example, contact position with the end portion of the guardrail). As a result, it becomes easier for the driver to recognize the steering angle required to get out on the road without coming into contact with the object. That is, the steering angle may be determined at the position before the steering angle corresponding to the displayed virtual vehicle image G5 is reached by operating the steering section 4. In this case, in addition to the virtual vehicle image G5 displayed by operating the direction indicator 26, the virtual vehicle image G5 corresponding to the steering angle changed by operating the steering section 4 may be displayed. In this case, it is possible to determine the steering angle that enables avoidance of the contact with the object, by adjusting the steering angle such that the virtual vehicle image G5 corresponding to the steering angle does not overlap the virtual vehicle image G5 which has been previously displayed. As a result, it is possible to perform a smooth start while avoiding contact with the object.

The driver may be notified of the steering angle corresponding to the virtual vehicle image G5 displayed by operating the direction indicator 26. For example, the maximum steering angle that does not come into contact with an object may be displayed or presented by a voice to cause the driver to operate, or the operation amount of the steering section 4 may be determined by automatic steering. As illustrated in FIG. 5, the approaching object indicator G6 may be displayed together such that the existence or the approaching direction of an object approaching the vehicle 1, such as a pedestrian, a bicycle, or another vehicle, may be displayed in a state of being easily recognized by the driver. When the virtual vehicle image G5 is set to be displayed by operating the direction indicator 26, and when it is not possible to detect an object having a possibility of coming into contact with the vehicle even though the steering angle is searched to the maximum steering angle, the virtual vehicle image G5 may be displayed to move in the direction corresponding to the maximum steering angle or set not to be displayed. In this case, for example, a display or message such as "the possibility of coming into contact with an object is low even though the steering angle is operated to the maximum steering angle" may be output. As described with reference to FIG. 21, the margin enlargement processing may be performed together on the virtual vehicle image G5. In this case, it is possible to perform a display that easily improves the sense of security of the driver when the vehicle travels while making a large turn.

A periphery monitoring program executed by the CPU 14a in the present embodiment may be configured to be a file in an installable format or an executable format and to be recorded in a computer readable recording medium such as a CD-ROM, a flexible disk (FD), a CD-R, a digital versatile disk (DVD) and then provided.

Further, the periphery monitoring program may be configured to be stored in a computer connected to a network such as the Internet and then provided by being downloaded via the network. The periphery monitoring program executed in the present embodiment may be configured to be provided or distributed via the network such as the Internet.

A periphery monitoring device according to an embodiment includes, for example, an acquisition section that acquires a current steering angle of a vehicle, an image acquisition section that acquires a captured image from an image capturing section that captures an image of a periphery of the vehicle, a detection section that acquires detection information of an object around the vehicle, and a control section that causes a display section to display a synthesized image including a vehicle image showing the vehicle and a periphery image showing the periphery of the vehicle based on the captured image. When the object is detected on a course when the vehicle travels at the current steering angle by a predetermined distance, the control section causes a virtual vehicle image virtually showing a shape of the vehicle to be displayed in the synthesized image so as to be superimposed on a course to the object with a position of the vehicle, which is shown by the vehicle image, as a reference. According to this configuration, for example, depending on whether or not the virtual vehicle image is displayed in the synthesized image, it is possible to perform a display that easily causes a user to intuitively recognize whether or not an object requiring attention is on a course, when the vehicle travels at the current steering angle.

In the periphery monitoring device in the embodiment, for example, the virtual vehicle image may be movable from the position of the vehicle toward a position of the object. According to this configuration, for example, it is possible to perform a display that easily causes a driver to recognize the existence of the virtual vehicle image, that is, a display that easily causes the driver to recognize that an object requiring attention is on the course. It is possible to perform a display that causes the position of an object to be recognized more easily, by the virtual vehicle image moving toward the object.

In the periphery monitoring device according to the embodiment, for example, the control section may change a display form of a partial image in contact with the object in the virtual vehicle image, and stop moving of the virtual vehicle image in the synthesized image at a position where the vehicle travels to a position at which the vehicle comes into contact with the object or to a position immediately before the vehicle is in contact with the object. According to this configuration, for example, based on the virtual vehicle image, it is possible to perform a display that easily causes the driver to recognize a position of a portion which is in contact with an object in a vehicle body of the vehicle or a position immediately before the vehicle is in contact with the object and causes the driver to easily drive the vehicle. Since the virtual vehicle image is stopped at the position in contact with the object or the position immediately before the vehicle is in contact with the object, it is possible to perform a display that causes the position of the object to be easily recognized and to perform a display that causes the contact between the detected object and the vehicle to be easily avoided.

In the periphery monitoring device according to the embodiment, for example, the virtual vehicle image may show the shape of the vehicle formed by polygons, and the partial image may be the polygon being in contact with the object among the polygons forming the virtual vehicle image. According to this configuration, for example, based on the virtual vehicle image, it is possible to perform a display that easily causes the driver to recognize a position of a portion having a possibility of coming into contact with the object in the vehicle body of the vehicle and causes the driver to easily drive the vehicle. It is possible to perform a display that causes the contact between the detected object and the vehicle to be easily avoided.

In the periphery monitoring device according to the embodiment, for example, the control section may change the display form of the partial image in accordance with a distance between the position of the object and the position of the vehicle shown by the virtual vehicle image. According to this configuration, for example, by checking the change in the display form of the partial image, it is possible to grasp the positional relation between the vehicle and the object in more detail, and to more easily cause the driver to perform driving such that the vehicle does not come into contact with the detected object.

In the periphery monitoring device according to the embodiment, for example, the control section may change the display form of the partial image to a first display form implying the contact when the distance is equal to or smaller than a predetermined value, and change the display form from the first display form to a second display form implying contact avoidance when the distance is changed from a state of being equal to or smaller than the predetermined value to exceed the predetermined value. According to this configuration, for example, it is possible to perform a display that easily causes the driver of the vehicle to determine whether there is a possibility of coming into contact with an object or the vehicle does not come into contact with the object.

In the periphery monitoring device according to the embodiment, for example, the vehicle image may be a bird's-eye view image of the vehicle. According to this configuration, for example, it is possible to perform a display that easily causes the driver to accurately grasp the positional relation between the vehicle and the surrounding objects.

In the periphery monitoring device according to the embodiment, for example, the virtual vehicle image may be an image showing a three-dimensional shape of the vehicle. According to this configuration, for example, it is possible to display a more realistic virtual vehicle image on a display section.

In the periphery monitoring device according to the embodiment, for example, the virtual vehicle image may be a semi-transmissive image showing the shape of the vehicle. According to this configuration, for example, it is possible to perform a display that easily causes the driver to distinguish the virtual vehicle image and the vehicle image from each other. It is possible to perform a display that easily causes the driver to intuitively recognize that the virtual vehicle image shows the future position of the vehicle.

In the periphery monitoring device according to the embodiment, for example, the virtual vehicle image may be an image in which a contour of the vehicle is displayed in a highlighted manner. According to this configuration, for example, it is possible to perform a display that easily causes the driver to recognize the future position of the vehicle, based on the virtual vehicle image. It is possible to visually recognize a portion of the vehicle image, which overlaps the virtual vehicle image and to easily suppress deterioration of the visibility of the surrounding situation.

In the periphery monitoring device according to the embodiment, for example, the virtual vehicle image may be an image having transmittance which increases from a contour of the vehicle to an inside. According to this configuration, for example, it is possible to perform a display that easily causes the driver to recognize the future position of the vehicle, based on the virtual vehicle image. It is possible to visually recognize a portion of the vehicle image, which overlaps the virtual vehicle image, and to easily suppress deterioration of the visibility of the surrounding situation.

In the periphery monitoring device according to the embodiment, for example, when the detection section detects the object, the control section may cause the synthesized image to be displayed in an enlarged manner than in a display state before the object is detected. According to this configuration, for example, it is possible to perform a display that easily causes the driver to intuitively recognize that it is necessary to pay attention to the surrounding situation because the object is detected by the enlarged display. It is possible to perform a display that easily causes the driver to check the details of the surroundings, and easily causes the driver to feel secure, by the enlarged display.

In the periphery monitoring device according to the embodiment, for example, when the control section performs the enlarged display, the control section may reduce a degree of the enlarged display when the vehicle is in a state of being movable backward, in comparison to a case other than the state of being movable backward. According to this configuration, for example, in a case where the vehicle is movable backward, it is possible to perform a display that easily causes the detection of the object to be intuitively recognized by the enlarged display and to perform a display that easily causes the object to be checked in a wide range by widening a display range for the periphery of the vehicle in comparison to a case other than the backward movement.

In the periphery monitoring device according to the embodiment, for example, when the synthesized image is displayed in the enlarged manner, the control section may perform a shift display in which a display position of the vehicle image is shifted in a direction opposite to a turning direction based on the current steering angle. According to this configuration, for example, since a display area in the turning direction is increased, it is possible to perform a display that easily causes the driver to grasp the situation in the direction in which the vehicle is about to head.

In the periphery monitoring device according to the embodiment, for example, when the vehicle is in a state of being movable backward, the control section may not perform the shift display. According to this configuration, for example, when the vehicle is in a state of being movable backward, it is possible to perform a display that easily causes the driver to recognize a situation regarding the entire area around the vehicle.

In the periphery monitoring device according to the embodiment, for example, when the control section sets the virtual vehicle image not to be displayed, the control section may bring the synthesized image back to a display state before the object is detected. According to this configuration, for example, it is possible to perform a display that easily causes the driver to recognize the display end of the virtual vehicle image. It is possible to perform a display that easily causes the driver to intuitively recognize that the possibility of contact with an object is reduced or eliminated.

In the periphery monitoring device according to the embodiment, for example, the control section temporarily may cause the virtual vehicle image to be a non-display state, and the control section may cancel the non-display state when a predetermined condition is satisfied. According to this configuration, for example, when the display of the virtual vehicle image is not required, it is possible to cause the virtual vehicle image not to be displayed and to suppress continuing of the non-display state.

In the periphery monitoring device according to the embodiment, for example, when the control section temporarily causes the virtual vehicle image to be the non-display state, the control section may enable redisplay only during a non-display period. According to this configuration, for example, it is possible to display the virtual vehicle image again even when the virtual vehicle image is set not to be displayed, if necessary, and to improve the usability.

In the periphery monitoring device according to the embodiment, for example, the control section may stop moving of the virtual vehicle image at a position where the vehicle travels to a position at which the vehicle comes into contact with the object or to a position immediately before the vehicle is in contact with the object, and then, when the steering angle is changed from the current steering angle, and the vehicle comes not to be in contact with the object, enable moving of the virtual vehicle image to be started again in a direction according to the changed steering angle. According to this configuration, for example, it is possible to cause the driver to more clearly recognize that the contact with the object can be eliminated by changing the steering angle, and that the contact has been eliminated. It is possible to perform a display that easily causes the driver to continue driving while paying attention to the possibility of contact with another object in the further area. When a check that the vehicle does not come into contact with the object is possible, the control section may cause the virtual vehicle image not to be displayed after a predetermined period.

The periphery monitoring device according to the embodiment may further include, for example, an operation switch enabling switching whether or not the virtual vehicle image is displayed on the display section. When the object is not detected on the course when the vehicle travels at the current steering angle by the predetermined distance, and the virtual vehicle image is allowed to be displayed on the display section by an operation of the operation switch, the control section may change a display form of the vehicle image. According to this configuration, for example, even before the object is detected on the course, the display form of the vehicle image is changed, and thus it is possible to display that the virtual vehicle image is in a display standby state. Thus, when the object is detected on the course, it is possible to perform a display that easily causes the driver to recognize that it is in the state of being immediately notified by the virtual vehicle image, and easily causes the driver to feel secure.

In the periphery monitoring device according to the embodiment, for example, when the control section causes the virtual vehicle image to be displayed, the control section may cause at least one of the length of the virtual vehicle image in a vehicle length direction and the length thereof in a vehicle width direction to be lengthened in comparison to the corresponding length of the vehicle image. According to this configuration, for example, a display is performed such that the size of the displayed virtual vehicle image is larger than the vehicle image. That is, it is possible to display the virtual vehicle image in a state where a safe and appropriate margin distance (safety margin) is included when the vehicle is moved in consideration of an object (for example, obstacle). As a result, it is possible to perform a display that easily causes contact with the object or too close proximity to be avoided. On the contrary, it is possible to realize a display that easily causes an excessive margin distance to be suppressed.

In the periphery monitoring device according to the embodiment, for example, the control section may cause only the length of the virtual vehicle image in the vehicle width direction to be lengthened. For example, when the vehicle moves forward and turns, the safety margin in the vehicle length direction tends to be easily recognized, but the safety margin in the vehicle width direction tends to be harder to be recognized than in the vehicle length direction. According to this configuration, for example, when the vehicle travels straight and turns, it is possible to secure a minimum, safe and appropriate margin distance in the vehicle width direction and to perform a display that easily presents a more appropriate moving path to the driver.

Although the embodiments and the modification examples disclosed here have been described, the embodiments and modification examples are presented as examples and are not intended to limit the scope of the invention. The novel embodiments can be implemented in various other forms, and various omissions, replacements, and changes can be made without departing from the gist of the invention. The embodiments and modifications thereof are included in the scope and the gist of the invention, and are also included in the invention described in the claims and the equivalent scope.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A periphery monitoring device comprising:
   at least one processor configured to implement:
   an acquisition section that acquires a current steering angle of a vehicle;
   an image acquisition section that acquires a captured image from an image capturing section that captures an image of a periphery of the vehicle;
   a detection section that acquires detection information of an object around the vehicle; and
   a control section that causes a display to display a synthesized image including a vehicle image showing the vehicle and a periphery image showing the periphery of the vehicle based on the captured image, wherein
   when the object is detected on a course when the vehicle travels at the current steering angle by a predetermined distance, the control section causes a virtual vehicle image virtually showing a shape of the vehicle to be displayed in the synthesized image so as to be superimposed on a course to the object with a position of the vehicle, which is shown by the vehicle image, as a reference,
   wherein when the detection section detects the object, the control section causes the synthesized image to be displayed in an enlarged manner than in a display state before the object is detected, and
   wherein when the synthesized image is displayed in the enlarged manner, the control section performs a shift display in which a display position of the vehicle image is shifted in a direction opposite to a turning direction based on the current steering angle.

2. The periphery monitoring device according to claim 1, wherein
   the virtual vehicle image is movable from the position of the vehicle toward a position of the object.

3. The periphery monitoring device according to claim 2, wherein
   a display form of a partial image in contact with the object in the virtual vehicle image is changed, and
   moving of the virtual vehicle image is stopped in the synthesized image at a position where the vehicle travels to a position at which the vehicle comes into contact with the object or to a position immediately before the vehicle is in contact with the object.

4. The periphery monitoring device according to claim 2, wherein
   the control section stops moving of the virtual vehicle image at a position where the vehicle travels to a position at which the vehicle comes into contact with the object or to a position immediately before the vehicle is in contact with the object, and then, when the steering angle is changed from the current steering angle, and the vehicle comes not to be in contact with the object, enables moving of the virtual vehicle image to be started again in a direction according to the changed steering angle.

5. The periphery monitoring device according to claim 3, wherein
   the virtual vehicle image shows the shape of the vehicle formed by polygons, and
   the partial image is the polygon being in contact with the object among the polygons forming the virtual vehicle image.

6. The periphery monitoring device according to claim 3, wherein
   the control section changes the display form of the partial image in accordance with a distance between the position of the object and the position of the vehicle shown by the virtual vehicle image.

7. The periphery monitoring device according to claim 6, wherein
   the control section changes the display form of the partial image to a first display form implying the contact when the distance is equal to or smaller than a predetermined value, and changes the display form from the first display form to a second display form implying contact avoidance when the distance is changed from a state of being equal to or smaller than the predetermined value to exceed the predetermined value.

8. The periphery monitoring device according to claim 1, wherein
the vehicle image is a bird's-eye view image of the vehicle.

9. The periphery monitoring device according to claim 1, wherein
the virtual vehicle image is an image showing a three-dimensional shape of the vehicle.

10. The periphery monitoring device according to claim 1, wherein
the virtual vehicle image is a semi-transmissive image showing the shape of the vehicle.

11. The periphery monitoring device according to claim 1, wherein
the virtual vehicle image is an image in which a contour of the vehicle is displayed in a highlighted manner.

12. The periphery monitoring device according to claim 1, wherein
the virtual vehicle image is an image having transmittance which increases from a contour of the vehicle to an inside.

13. The periphery monitoring device according to claim 1, wherein
when the control section performs the enlarged display, the control section reduces a degree of the enlarged display when the vehicle is in a state of being movable backward, in comparison to a case other than the state of being movable backward.

14. The periphery monitoring device according to claim 1, wherein
when the vehicle is in a state of being movable backward, the control section does not perform the shift display.

15. The periphery monitoring device according to claim 1, wherein
when the control section sets the virtual vehicle image not to be displayed, the control section brings the synthesized image back to a display state before the object is detected.

16. The periphery monitoring device according to claim 1, wherein
the control section temporarily causes the virtual vehicle image to be a non-display state, and
the control section cancels the non-display state when a predetermined condition is satisfied.

17. The periphery monitoring device according to claim 16, wherein
when the control section temporarily causes the virtual vehicle image to be the non-display state, the control section enables redisplay only during a non-display period.

18. The periphery monitoring device according to claim 1, further comprising:
an operation switch enabling switching of whether or not the virtual vehicle image is displayed on the display, wherein
when the object is not detected on the course when the vehicle travels at the current steering angle by the predetermined distance, and the virtual vehicle image is allowed to be displayed on the display by an operation of the operation switch, the control section changes a display form of the vehicle image.

* * * * *